(12) United States Patent
Iwahashi et al.

(10) Patent No.: US 8,126,635 B2
(45) Date of Patent: Feb. 28, 2012

(54) AIR-FUEL RATIO CONTROL APPARATUS AND AIR-FUEL RATIO CONTROL METHOD

(75) Inventors: Kazuhiro Iwahashi, Okazaki (JP); Hiroshi Morita, Obu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 274 days.

(21) Appl. No.: 12/664,766

(22) PCT Filed: Jun. 13, 2008

(86) PCT No.: PCT/IB2008/001519
§ 371 (c)(1),
(2), (4) Date: Dec. 15, 2009

(87) PCT Pub. No.: WO2008/152487
PCT Pub. Date: Dec. 18, 2008

(65) Prior Publication Data
US 2010/0180874 A1  Jul. 22, 2010

(30) Foreign Application Priority Data
Jun. 15, 2007  (JP) .................................. 2007-159443

(51) Int. Cl.
*F02D 41/30* (2006.01)
(52) U.S. Cl. ..................... 701/104; 701/109; 123/90.15; 123/346; 123/674
(58) Field of Classification Search .......... 123/345–348, 123/90.11, 90.15, 672, 674, 703, 480; 701/103–105, 701/109
See application file for complete search history.

(56) References Cited

U.S. PATENT DOCUMENTS

| | | | |
|---|---|---|---|
| 4,901,240 A | 2/1990 | Schmidt et al. | |
| 5,467,755 A | 11/1995 | Konrad et al. | |
| 6,360,733 B1 | 3/2002 | Uberti Bona Blotto et al. | |
| 7,472,697 B2 * | 1/2009 | Morita et al. | 123/679 |
| 8,015,967 B2 * | 9/2011 | Morita et al. | 123/674 |
| 2007/0125350 A1 | 6/2007 | Morita et al. | |
| 2010/0070159 A1 * | 3/2010 | Iwahashi et al. | 701/105 |

FOREIGN PATENT DOCUMENTS

| | | | |
|---|---|---|---|
| EP | 2090768 | * | 8/2009 |
| JP | 7 293312 | | 11/1995 |
| JP | 2001 152929 | | 6/2001 |
| JP | 2001 263015 | | 9/2001 |
| JP | 2004 36396 | | 2/2004 |
| JP | 2004 132314 | | 4/2004 |

(Continued)

*Primary Examiner* — Hai Huynh
(74) *Attorney, Agent, or Firm* — Oblon, Spivak, McClelland, Maier & Neustadt, L.L.P.

(57) ABSTRACT

An air-fuel ratio control apparatus includes a learning unit learning amounts of divergence of a correction amount from a reference value thereof respectively as to a plurality of set lift amount regions as divergence amount learning values, a correction unit calculating a divergence amount correction value and correcting a fuel injection amount command value, and a reflection unit reflecting a learning result of the divergence amount learning value of a specific one of the plurality of the set lift amount regions on the divergence amount learning value of another one of the lift amount regions when there is a history indicating that the divergence amount learning value of the specific one of the lift amount regions has been learned and there is no history indicating that the divergence amount learning value of that another one of the lift amount regions has been learned.

12 Claims, 15 Drawing Sheets

FOREIGN PATENT DOCUMENTS

| | | |
|---|---|---|
| JP | 2005 23874 | 1/2005 |
| JP | 2005 105834 | 4/2005 |
| JP | 2005 226554 | 8/2005 |
| JP | 2006 170016 | 6/2006 |
| JP | 2007-154749 | 6/2007 |
| JP | 2008-144706 * | 6/2008 |

* cited by examiner

FIG.12

| VL>VL1 | VL1≥VL>VL2 | VL2≥VL>VL3 | VL3≥VL |
|---|---|---|---|
| REGION 1 | REGION 2 | REGION 3 | REGION 4 |
| LEARNING VALUE GK 1 | LEARNING VALUE GK 2 | LEARNING VALUE GK 3 | LEARNING VALUE GK 4 |

FIG. 14

| SITUATION | C FLAG | D FLAG | E FLAG | F FLAG | MODE OF APPROPRIATION |
|---|---|---|---|---|---|
| (i) | ON | OFF | OFF | OFF | (GK2, GK3, GK4)←GK1 |
| (ii) | | ON | OFF | OFF | (GK3, GK4)←GK2 |
| (iii) | | ON | ON | OFF | GK4←GK3 |
| (iv) | | ON | OFF | ON | GK3←GK2 |
| (v) | | OFF | ON | OFF | GK2←GK1, GK4←GK3 |
| (vi) | | OFF | OFF | ON | (GK2, GK3)←GK1 |
| (vii) | | OFF | ON | ON | GK2←GK1 |
| (viii) | | ON | ON | ON | NO APPROPRIATION |

F I G . 16
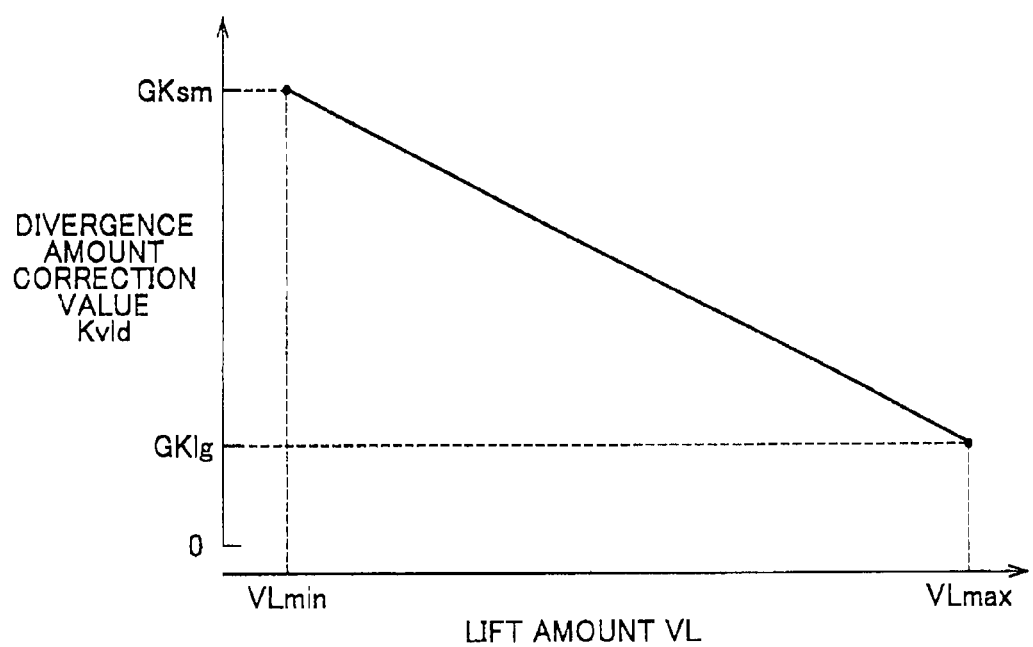

AIR-FUEL RATIO CONTROL APPARATUS AND AIR-FUEL RATIO CONTROL METHOD

FIELD OF THE INVENTION

The invention relates to an air-fuel ratio control apparatus and an air-fuel ratio control method. More specifically, the invention relates to an air-fuel ratio control apparatus and an air-fuel ratio control method that are applied, with a view to performing air-fuel ratio control, to an internal combustion engine equipped with a lift amount change mechanism for changing the lift amount of intake valves.

BACKGROUND OF THE INVENTION

In an internal combustion engine, as a rule, a catalyst for exhaust gas purification that is provided in an exhaust passage thereof purifies exhaust gas components. The purification of exhaust gas components by this catalyst for exhaust gas purification is efficiently carried out when the air-fuel ratio of a mixture burned in the internal combustion engine is within a predetermined range. Thus, air-fuel ratio control is performed by providing in the exhaust passage a sensor for outputting a signal corresponding to the concentration of oxygen in exhaust gas, detecting an actual air-fuel ratio of the mixture based on the output signal of this sensor, and feedback-controlling the amount of fuel injection such that the detected actual air-fuel ratio becomes equal to a target air-fuel ratio.

On the other hand, Japanese Patent Application Publication No. 2001-263015 (JP-A-2001-263015) discloses an apparatus that includes a lift amount change mechanism provided in an internal combustion engine to change the lift amount (in more detail, the maximum lift amount) of intake valves. In this apparatus, the action of the lift amount change mechanism is controlled such that a desired lift amount coincides with an actual lift amount. Thus, the intake valves are opened/closed with a lift amount suited for an engine operational state at each moment.

The lift amount of the intake valves has an individual difference resulting from the influence of a mounting error or the like. Therefore, the passage area of a communication region between an intake passage and a combustion chamber in the internal combustion engine is slightly different from a reference area thereof. Further, deposits may adhere to the intake valves as the engine is operated. In this case, the passage area changes to become different from the reference area thereof. This difference between the passage area and the reference area thereof constitutes a factor in a reduction of the accuracy in adjusting the amount of intake air and hence a reduction of the accuracy in adjusting the air-fuel ratio of the mixture. In an internal combustion engine in which the aforementioned feedback control is performed, the feedback control basically compensates for a change in the air-fuel ratio resulting from the difference between the passage area and the reference area thereof, thereby avoiding a reduction of the accuracy in adjusting the air-fuel ratio.

However, in the case where the passage area is different from the reference area thereof in the internal combustion engine provided, with the lift amount change mechanism, the change in the air-fuel ratio resulting from the difference differs depending on the mode of action of the lift amount change mechanism. Therefore, in the case where the mode of action of the lift amount change mechanism is frequently changed to suit an engine operational state at each moment, the change in the air-fuel ratio also changes frequently as the mode of action of the lift amount change mechanism is changed. Accordingly, when feedback control is performed simply based on a signal of a sensor as in the case of the apparatus disclosed in Japanese Patent Application Publication No. 2001-263015 (JP-A-2001-263015), it may become impossible to follow such frequent changes in the mode of action and adequately compensate for changes in the air-fuel ratio resulting from the changes in the mode of action.

SUMMARY OF THE INVENTION

The invention provides an air-fuel ratio control apparatus capable of restraining exhaust gas properties from deteriorating in an internal combustion engine includes a lift amount change mechanism.

A first aspect of the invention relates to an air-fuel ratio control apparatus. This air-fuel ratio control apparatus for an internal combustion engine that includes a lift amount change mechanism for changing the lift amount of intake valves and a sensor for outputting a signal corresponding to the concentration of oxygen in exhaust gas, and sets a fuel injection amount command value through a feedback control using a correction amount calculated based on an output value of the sensor. This air-fuel ratio control apparatus includes a learning unit that learns amounts of divergence of the correction amount from a reference value thereof as divergence amount learning values as to a plurality of set lift amount regions respectively, a correction unit that calculates a divergence amount correction value based on the respective divergence amount learning values learned by the learning unit and the lift amount of the intake valves and correcting the fuel injection amount command value in an increasing/decreasing manner with the calculated divergence amount correction value, and a reflection unit that reflects a learning result of the divergence amount learning value of a specific one of the plurality of the set lift amount regions on the divergence amount learning value of another one of the lift amount regions if there is a history indicating that the divergence amount learning value of the specific one of the lift amount regions has been learned and there is no history indicating that the divergence amount learning value of that another one of the lift amount regions has been learned.

According to the foregoing configuration, the amounts of divergence of the correction amount from the reference value thereof can be learned in accordance with the lift amount of the intake valves and used to set the fuel injection amount command value. Therefore, after the divergence amount learning values are learned as to all the lift amount regions, the air-fuel ratio of the mixture can be adjusted to a desired ratio while restricting the influence of the difference in the mode of action of the lift amount change mechanism on the air-fuel ratio through the correction in the increasing/decreasing manner with the divergence amount correction value. As a result, the properties of exhaust gas can be restrained from deteriorating.

Besides, in the case where all the divergence amount learning values have not been learned, for example, in the case where a battery has been replaced, when the divergence amount learning value is learned as to one of the lift amount regions during subsequent engine operation, the learning result of the divergence amount learning value is reflected on the divergence amount learning value of another one of the lift amount regions. Therefore, as for those of the lift amount regions whose divergence amount learning values have not been learned as well, the divergence amount learning values can be changed so as to approach realistic values respectively. As a result, the period in which the divergence amount learning values are held equal to their initial values, that is, values significantly different from the realistic values can be shortened. Thus, the properties of exhaust gas can also be restrained from deteriorating until all the divergence amount learning values are learned to become equal to the realistic values respectively.

The reflection unit may appropriate the divergence amount learning value of the specific one of the lift amount regions as the divergence amount learning value of that another one of the lift amount regions, and make this appropriation if a lift amount in another one of the lift amount regions is smaller than the lift amount in the specific one of the lift amount region.

In the foregoing configuration, the learning result of the divergence amount learning value of the specific one of the lift amount regions is reflected on the divergence amount learning value of that another one of the lift amount regions by appropriating the divergence amount learning value of the specific one of the lift amount regions as the divergence amount learning value of that another one of the lift amount regions.

In the case where the passage area of the communication region between the intake passage of the engine and the combustion chamber is different from the reference area thereof due to the mounting error of the intake valves or the adhesion of deposits to the intake valves, the amount of divergence of the correction amount from the reference value thereof increases as the lift amount of the intake valves decreases. Therefore, when the divergence amount learning value of the specific one of the lift amount regions is simply appropriated as the divergence amount learning value of that another one of the lift amount regions, the amount of the correction with the divergence amount learning value of that another one of the lift amount regions may become excessively large and cause a deterioration rather than an improvement in the properties of exhaust gas in the case where the specific one of the lift amount regions is located on the small lift amount side with respect to that another one of the lift amount regions.

In this respect, according to the foregoing configuration, the appropriation of the divergence amount learning value can be made only when the amount of the correction with the divergence amount learning value is unlikely to become excessively large, and the divergence amount learning value can be changed to a suitable value through the appropriation.

The reflection unit may increase the divergence amount learning value of that another one of the lift amount regions to exceed the divergence amount learning value of the specific one of the lift amount regions as that another one of the lift amount regions is located more toward the small lift amount side with respect to the specific one of the lift amount regions.

The internal combustion engine may have an exhaust passage thereof with an exhaust gas purification catalyst, and the sensor may be provided downstream of the exhaust gas purification catalyst in the exhaust passage with respect to a direction in which exhaust gas flows.

In order to grasp the state of purification of exhaust gas components by the exhaust gas purification catalyst, there is known an apparatus having a sensor, which outputs a signal corresponding to the concentration of oxygen in exhaust gas, provided downstream of the exhaust gas purification catalyst to perform feedback control of a fuel injection amount command value based on the output signal of the sensor. According to the foregoing configuration, the properties of exhaust gas can be desirably restrained from deteriorating in the apparatus for performing such feedback control.

The internal combustion engine may include another sensor for outputting a signal corresponding to the concentration of oxygen, which is located upstream of the exhaust gas purification catalyst with respect to the direction in which exhaust gas flows, in addition to the sensor located downstream of the exhaust gas purification catalyst in the exhaust passage with respect to the direction in which exhaust gas flows, and the air-fuel ratio control apparatus may correct the fuel injection amount command value in an increasing/decreasing manner based on the output value of the sensor located upstream in accordance with the performance of the feedback control.

There is known an apparatus for correcting the fuel injection amount command value in an increasing/decreasing manner (performing main feedback control) based on an output signal of the sensor located upstream with respect to the direction in which exhaust gas flows and performing feedback control of the fuel injection amount command value with the correction amount based on an output signal of the sensor located downstream with respect to the direction in which exhaust gas flows (performing sub-feedback control).

According to the foregoing configuration, in such an apparatus, the amount of divergence of the correction amount of sub-feedback control from the reference value thereof can be learned in accordance with the lift amount of the intake valves and used to set the fuel injection amount command value, and the properties of exhaust gas can be desirably restrained from deteriorating through the adjustment of the amount of fuel injection according to main feedback control and sub-feedback control.

The internal combustion engine may be a multi-cylinder internal combustion engine, and the sensor located upstream may be provided as a single sensor common to all cylinders of the internal combustion engine.

In the multi-cylinder internal combustion engine, the air-fuel ratio of the mixture inevitably disperses among the cylinders as a result of the individual differences among fuel injection valves, the adhesion of deposits to the intake valves, or the like. In correcting the fuel injection amount command value in an increasing/decreasing manner based on the output signal of the sensor located upstream that is common to all the cylinders, such dispersion constitutes a factor in an impediment to the enhancement of the accuracy in adjusting the properties of exhaust gas upstream of the exhaust gas purification catalyst to the properties corresponding to a ratio in the neighborhood of a theoretical air-fuel ratio. In the multi-cylinder internal combustion engine, therefore, the amount of change in the air-fuel ratio is likely to increase as the difference between the output value of the sensor located downstream and the reference value thereof is changed and hence as the lift amount of the intake valves is changed.

According to the foregoing configuration, the properties of exhaust gas can be desirably restrained from deteriorating in the apparatus applied to such a multi-cylinder internal combustion engine.

In the air-fuel ratio control apparatus, the plurality of the set lift amount regions may be composed of a first specific lift amount and a second specific lift amount, and the correction unit may calculate the divergence amount correction value by interpolating divergence amount learning values learned respectively as to the first specific lift amount and the second specific lift amount based on a relationship between both the specific lift amounts and the lift amount of the intake valves.

According to the foregoing configuration, the divergence amount correction value can be calculated with a lower learning frequency and over a wider lift amount region in comparison with a configuration in which lift amount regions are finely set and divergence amounts are calculated respectively for the regions to be learned as divergence amount learning values.

The first specific lift amount may be a control limit lift amount on a large lift amount side, and the second specific lift amount may be a control limit lift amount on the small lift amount side.

An interpolation method with a preset conversion coefficient or a linear interpolation method may be adopted as an interpolation method used to calculate the divergence amount correction value. Alternatively, a map defining a relationship between lift amount and divergence correction value may be used as the interpolation method.

The correction unit may select one of the plurality of the lift amount regions based on the lift amount of the intake valves and calculate that one of the divergence amount learning values which corresponds to the selected one of the regions as the divergence amount correction value.

According to the foregoing configuration, in the case where the passage area of the communication region between the intake passage and the combustion chamber is different from the reference area thereof, the divergence amounts can be learned respectively as to the plurality of the lift amount regions that are different from one another in the influence of the difference on the air-fuel ratio, and used to set the fuel injection amount command value.

A second aspect of the invention relates to an air-fuel ratio control method. This air-fuel ratio control method for an internal combustion engine that includes a lift amount change mechanism for changing the lift amount of intake valves and a sensor for outputting a signal corresponding to the concentration of oxygen in exhaust gas, and sets a fuel injection amount command value through feedback control using a correction amount calculated based on an output value of the sensor. This air-fuel ratio control method carries out the learning of amounts of divergence of the correction amount from a reference value thereof as divergence amount learning values as to a plurality of set lift amount regions respectively, the calculating of a divergence amount correction value based on the divergence amount learning values and the lift amount of the intake valves and the correcting of the fuel injection amount command value in an increasing/decreasing manner with the calculated divergence amount correction value, and the reflecting of a learning result of the divergence amount learning value of a specific one of the plurality of the set lift amount regions on the divergence amount learning value of another one of the lift amount regions when there is a history indicating that the divergence amount learning value of the specific one of the lift amount regions has been learned and there is no history that indicates the divergence amount learning value of that another one of the lift amount regions has been learned.

The learning result of the divergence amount learning value of the specific one of the lift amount regions may be reflected on the divergence amount learning value of that another one of the lift amount regions by appropriating the divergence amount learning value of the specific one of the lift amount regions as the divergence amount learning value of that another one of the lift amount regions when that another one of the lift amount regions is located on a small lift amount side with respect to the specific one of the lift amount regions.

The learning result of the divergence amount learning value of the specific one of the lift amount regions may be reflected on the divergence amount learning value of that another one of the lift amount regions by making the divergence amount learning value of that another one of the lift amount regions even larger than the divergence amount learning value of the specific one of the lift amount regions as that another one of the lift amount regions is located more toward the small lift amount side with respect to the specific one of the lift amount regions.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 12 is a schematic diagram showing a relationship between the lift amount of the intake valves and divergence amount learning value in the second embodiment of the invention;

FIG. 14 is a schematic diagram showing a mode of appropriation of the divergence amount learning value in the second embodiment of the invention;

FIG. 16 is a graph showing a relationship between the lift amount of the intake valves and divergence amount correction value in still another embodiment of the invention.

DETAILED DESCRIPTION OF THE EMBODIMENTS

Figure 1:
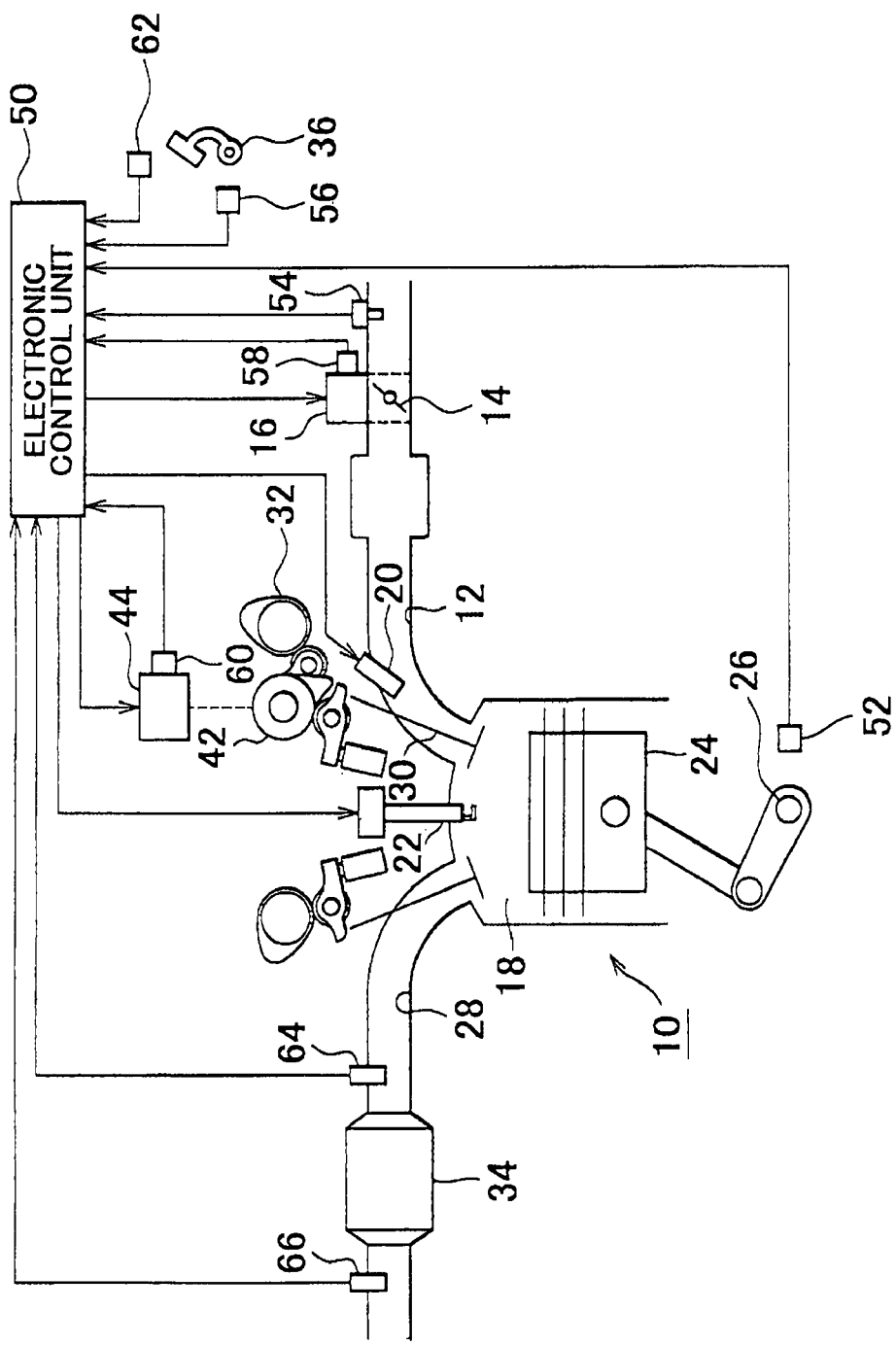
FIG. 1 is a schematic diagram showing an overall configuration of an air-fuel ratio control apparatus according to the first embodiment of the invention.

The first embodiment of the invention will be described. FIG. 1 shows the overall configuration of an air-fuel ratio control apparatus according to this embodiment of the invention.

As shown in FIG. 1, a throttle valve 14 is provided in an intake passage 12 of an internal combustion engine 10. A throttle motor 16 is coupled to the throttle valve 14. The opening degree of the throttle valve 14 (a throttle opening degree TA) is adjusted through driving control of this throttle motor 16. The amount of air sucked into a combustion chamber 18 through the intake passage 12 is thereby adjusted. A fuel injection valve 20 is provided in the intake passage 12. This fuel injection valve 20 injects fuel into the intake passage 12. In addition, an exhaust gas purification catalyst 34 is provided in an exhaust passage 28 of the internal combustion engine 10.

In the combustion chamber 18 of the internal combustion engine 10, a mixture composed of intake air and injected fuel is ignited by an ignition plug 22. Owing to this ignition operation, the mixture burns, a piston 24 moves in a reciprocating manner, and a crankshaft 26 rotates. The burned mixture is then sent out as exhaust gas from the combustion chamber 18 to the exhaust passage 28, purified through the exhaust gas purification catalyst 34, and thereafter discharged to the outside of the exhaust passage 28.

Figure 2:
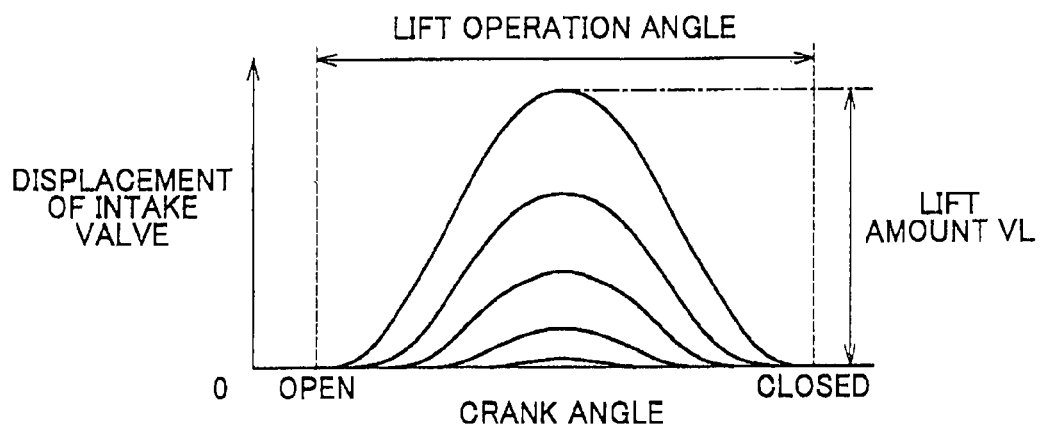
FIG. 2 is a graph showing a mode of change in the lift amount of intake valves based on the action of a lift amount change mechanism.

In the internal combustion engine 10, the intake passage 12 and the combustion chamber 18 are brought into/out of communication with each other through opening/closing operations of an intake valve 30. The intake valve 30 operates to open/close as an intake cam shaft 32 to which rotation of the crankshaft 26 is transmitted rotates. In addition, a lift amount change mechanism 42 is provided between the intake valve 30 and the intake cam shaft 32. This lift amount change mechanism 42 changes a lift amount VL (in more detail, a maximum lift amount) of the intake valve 30 in accordance with an engine operational condition, and acts through driving control of an actuator 44 such as an electric motor or the like. As shown in FIG. 2, due to the action of this lift amount change mechanism 42, the lift amount VL of the intake valve 30 changes in synchronization with a valve-open period (a lift operation angle). For example, the lift amount VL decreases as the lift operation angle decreases.

The apparatus according to this embodiment of the invention is equipped with various sensors for detecting the operational state of the internal combustion engine 10 (FIG. 1). For example, a crank sensor 52 for detecting a rotational speed of the crankshaft 26 (an engine rotational speed NE), an intake air amount sensor 54 for detecting an amount of intake air flowing through the intake passage 12 (a passage intake air amount GA), and an accelerator sensor 56 for detecting a depression amount AC of an accelerator pedal 36 are provided as the various sensors. Further, a throttle sensor 58 for detecting the throttle opening degree TA, a lift amount sensor 60 for detecting the lift amount VL of the intake valve 30 (to be exact, an amount of action of the lift amount change mechanism 42), and a temperature sensor 62 for detecting a temperature of engine coolant (a coolant temperature THW) are provided. Besides, an air-fuel ratio sensor 64 provided in that region of the exhaust passage 28 which is located upstream of the exhaust gas purification catalyst 34 with respect to a direction in which exhaust gas flows (hereinafter referred to simply as "upstream side") to output a signal corresponding to the concentration of oxygen in exhaust gas is provided. An oxygen sensor 66 provided in that region of the exhaust passage 28 which is located downstream of the exhaust gas purification catalyst 34 with respect to the direction in which exhaust gas flows (hereinafter referred to simply as "downstream side") to output a signal corresponding to the concentration of oxygen in exhaust gas and the like are also provided.

Figure 3:
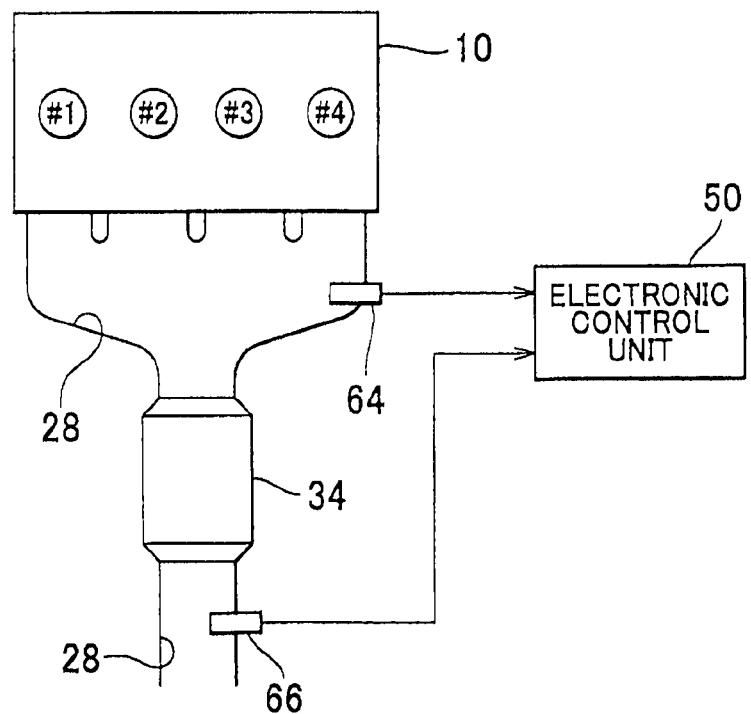
FIG. 3 is a schematic diagram showing positions in an exhaust passage where an air-fuel ratio sensor and an oxygen sensor are disposed.

As shown in FIG. 3, the internal combustion engine 10 has four cylinders #1, #2, #3, and #4. The air-fuel ratio sensor 64, which is common to all the cylinders #1 to #4, is provided in a confluent region of the exhaust passage 28 (an exhaust manifold) extending from the respective cylinders #1 to #4.

The air-fuel ratio sensor 64 is a known limiting current type oxygen sensor. This limiting current type oxygen sensor is a concentration cell type oxygen sensor whose detection portion is equipped with a ceramic layer called a diffusion-controlled layer to obtain an output current corresponding to the concentration of oxygen in exhaust gas. The output current of the air-fuel ratio sensor, 64 is "0" when the air-fuel ratio of the mixture, which is closely related to the concentration of oxygen in exhaust gas, is equal to the theoretical air-fuel ratio. The output current increases in a negative direction as the air-fuel ratio of the mixture becomes richer, and increases in a positive direction as the air-fuel ratio of the mixture becomes leaner. Accordingly, the degree of leanness or richness of the air-fuel ratio of the mixture can be detected based on an output signal of this air-fuel ratio sensor 64.

The oxygen sensor 66 is a known concentration cell type oxygen sensor. An output voltage of about 1 V is obtained from the concentration cell type oxygen sensor when the concentration of oxygen in exhaust gas is equal to a concentration at the time when the air-fuel ratio of the mixture is richer than the theoretical air-fuel ratio, and an output voltage of about 0 V is obtained from the concentration cell type oxygen sensor when the concentration of oxygen in exhaust gas is equal to a concentration at the time when the air-fuel ratio of the mixture is leaner than the theoretical air-fuel ratio. The output voltage of the concentration cell type oxygen sensor greatly changes when the concentration of oxygen in exhaust gas is equal to a concentration at the time when the air-fuel ratio of the mixture is in the neighborhood of the theoretical air-fuel ratio. Accordingly, it is possible to detect whether the exhaust gas downstream of the exhaust gas purification catalyst 34 has properties corresponding to leanness or richness, based on an output signal of the oxygen sensor 66.

This oxygen sensor 66 is provided downstream of the exhaust gas purification catalyst 34 to monitor the state of the operation of exhaust gas purification in the exhaust gas purification catalyst 34. That is, the output signal of the oxygen sensor 66 assumes a value corresponding to leanness when the operation of reduction is promoted in the exhaust gas purification catalyst 34 to discharge oxygen into exhaust gas. On the other hand, the output signal of the oxygen sensor 66 assumes a value corresponding to richness when the operation of oxidation is promoted in the exhaust gas purification catalyst 34 to consume oxygen in exhaust gas. The state of the operation of exhaust gas purification in the exhaust gas purification catalyst 34 is monitored based on a detection result of the oxygen sensor 66.

The apparatus according to this embodiment of the invention is equipped with an electronic control unit 50 constructed with, for example, a microcomputer. This electronic control unit 50 acquires detection signals of the various sensors, makes various calculations, and performs various kinds of control such as driving control of the throttle motor 16 (throttle control), driving control of the fuel injection valve 20 (fuel injection control), driving control of the actuator 44 (lift amount change control), and the like based on results of the calculations.

In this embodiment of the invention, the amount of air sucked into the combustion chamber 18 (in-cylinder intake air amount) is adjusted as follows through cooperative control of throttle control and lift amount change control. That is, a control target value of the in-cylinder intake air amount (a target in-cylinder intake air amount Tga) is calculated based on the depression amount AC of the accelerator pedal 36 and the engine rotational speed NE. Throttle control and lift amount change control are performed such that the target in-cylinder intake air amount Tga coincides with an, actual in-cylinder intake air amount. In performing throttle control and lift amount change control, when the internal combustion engine 10 has not been warmed up (more specifically, the coolant temperature THW<a predetermined temperature), the lift amount VL is fixed to a control limit lift amount on a large lift amount side (an upper-limit lift amount VLmax), and the throttle opening degree TA is changed to adjust the in-cylinder intake air amount. On the other hand, when the internal combustion engine 10 has been warmed up (more specifically, the coolant temperature THW≧the predetermined temperature), the throttle opening degree TA and the lift amount VL are both changed to adjust the in-cylinder intake air amount. In this case, the lift amount VL of the intake valve 30 and the throttle opening degree TA are basically set smaller as the in-cylinder intake air amount suited for the operational, state of the internal combustion engine 10 (a later-described estimated in-cylinder intake air amount Vga) decreases.

Figure 4:
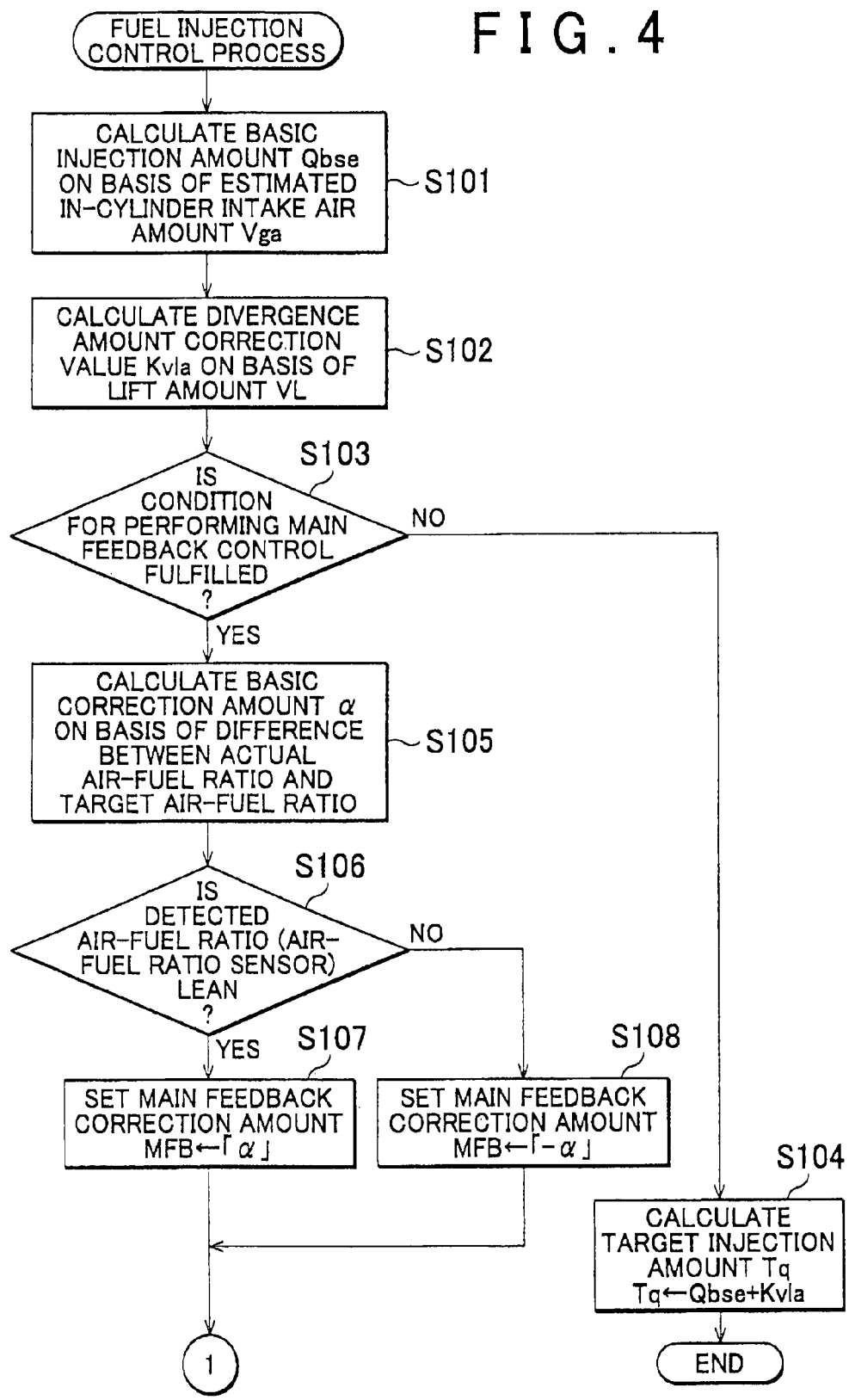
FIG. 4 is a flowchart showing a concrete processing procedure of a fuel injection control process according to the first embodiment of the invention.
Figure 5:
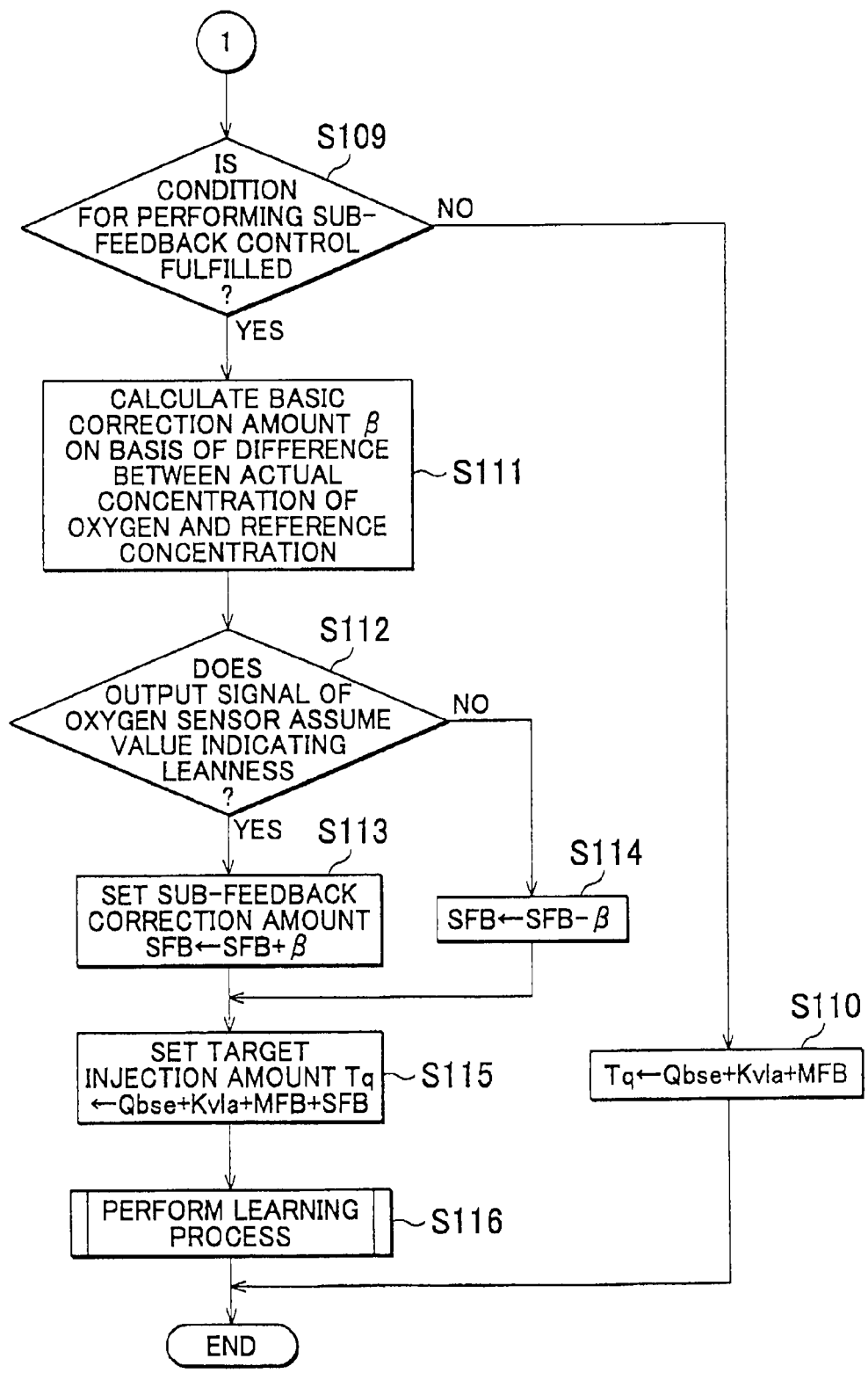
FIG. 5 is a flowchart showing a concrete processing procedure of the fuel injection control process.

In this embodiment of the invention, the amount of fuel injection is adjusted in a form corresponding to the estimated in-cylinder intake air amount Vga through fuel injection control. This fuel injection control will be described hereinafter. FIGS. 4 and 5 are both flowcharts showing concrete processing procedures of processes regarding fuel injection control. A series of processings shown in these flowcharts are performed by the electronic control unit 50 as a process on a predetermined cycle.

As shown in FIG. 4, first of all in this process, the estimated in-cylinder intake air amount Vga is calculated based on the passage intake air amount GA or the like, and a basic injection amount Qbse is calculated based on the estimated in-cylinder intake air amount Vga (step S101). This basic injection amount Qbse is a value corresponding to an anticipated control amount in fuel injection control. A fuel injection amount where the air-fuel ratio of the mixture burned in the combustion chamber 18 is equal to the theoretical air-fuel ratio is calculated as the basic injection amount Qbse for the estimated in-cylinder intake air amount Vga.

A divergence amount correction value Kvla is calculated based on the lift amount VL (step S102). A concrete mode of calculating this divergence amount correction value Kvla and an operation resulting from the calculation of the divergence amount correction value Kvla will be described later.

It is then determined whether or not a performance condition for main feedback control (feedback control of a fuel injection amount command value based on the output value of the air-fuel ratio sensor 64) is fulfilled (step S103). In this case, it is determined that the aforementioned performance condition is fulfilled when the following respective conditions are both fulfilled, namely, when the internal combustion engine 10 has been warmed up and the air-fuel ratio sensor 64 is sufficiently activated.

When the aforementioned performance condition is not fulfilled (step S103: NO), a value obtained by adding the divergence amount correction value Kvla to the basic injection amount Qbse (=Qbse+Kvla) is calculated as a fuel injection amount command value (a target injection amount Tq) (step S104). After that, the present process is temporarily terminated. In this case, the target injection amount Tq is set through anticipation control based on the engine operational state. The air-fuel ratio of the mixture can then be made to approach the theoretical air-fuel ratio by driving the fuel injection valve 20 such that fuel is injected in an amount equal to the target injection amount Tq.

On the other hand, when the aforementioned performance condition is fulfilled (step S103: YES), an actual air-fuel ratio of the mixture is detected by the air-fuel ratio sensor 64, and a basic correction amount α is calculated based on a difference between this actual air-fuel ratio and a target air-fuel ratio (the theoretical air-fuel ratio in this case) (step S105). This basic correction amount α is calculated as an amount that increases as the aforementioned difference increases.

When the air-fuel ratio detected by the air-fuel ratio sensor 64 is lean (step S106: YES), the basic correction amountα is set as a main feedback correction amount MFB (step S107). On the other hand, when the air-fuel ratio detected by the air-fuel ratio sensor 64 is rich (step S106: NO), a value obtained by multiplying the basic correction amount α by "−1.0" (−α) is set as the main feedback correction amount MFB (step S108).

After the main feedback correction amount MFB is thus set, it is determined as shown in FIG. 5 whether or not a performance condition for sub-feedback control (feedback control of the target injection amount Tq based on the output value of the oxygen sensor 66) is fulfilled (step S109). In this case, it is determined that the aforementioned performance condition is fulfilled when the following respective conditions are both fulfilled, namely, when the exhaust gas purification catalyst 34 is sufficiently activated and the oxygen sensor 66 is sufficiently activated.

When the aforementioned performance condition is not fulfilled (step S109: NO), a value obtained by adding the divergence amount correction value Kvla and the main feedback correction amount MFB to the basic injection amount Qbse is calculated as the target injection amount Tq (=Qbse+Kvla+MFB) (step S110), After that, the present process is temporarily terminated. In this case, the target injection amount Tq is set through anticipation control and main feedback control.

The exhaust gas purification catalyst 34 performs the operations of oxidizing HC and CO in exhaust gas and reducing NOx in the exhaust gas to purify the exhaust gas when combustion occurs in the neighborhood of the theoretical air-fuel ratio. The exhaust gas purification catalyst 34 efficiently purifies all the main noxious components (HC, CO, NOx) in exhaust gas especially in a narrow range (window) where the air-fuel ratio of the mixture is in the neighborhood of the theoretical air-fuel ratio. Thus, in order to cause the exhaust gas purification catalyst 34 to function effectively, the air-fuel ratio of the mixture needs to be strictly adjusted to be located at the center of the aforementioned window. When the performance condition for sub-feedback control is not fulfilled (step S109: NO), the amount of fuel injection is adjusted through main feedback control such that the actual air-fuel ratio coincides with the target air-fuel ratio.

On the other hand, when the performance condition for sub-feedback control is fulfilled (step S109: YES), it is determined whether or not an output signal of the oxygen sensor 66 assumes a value indicating leanness (step S112). Then, when the output signal of the oxygen sensor 66 assumes a value indicating leanness (step S112: YES), a value obtained by adding a constant value β to a stored sub-feedback correction amount SFB (SFB+β) is set as a new sub-feedback correction amount SFB so that the sub-feedback correction amount SFB gradually increases (step S113). On the other hand, when the output signal of the oxygen sensor 66 assumes a value indicating richness (step S112: NO), a value obtained by subtracting the constant value β from the stored sub-feedback correction amount SFB (SFB−β) is set as a new sub-feedback correction amount SFB so that the sub-feedback correction amount SFB gradually decreases (step S114).

After the sub-feedback correction amount SFB is thus set, a value obtained by adding the divergence amount correction value Kvla, the main feedback correction amount MFB, and the sub-feedback correction amount SFB to the basic injection amount Qbse is calculated as the target injection amount Tq (=Qbse+Kvla+MFB+SFB) (step S115). Accordingly, in this case (step S109: YES), the target injection amount Tq is set through anticipation control, main feedback control, and sub-feedback control. Thus, in addition to the adjustment of the amount of fuel injection through main feedback control in such a manner that the actual air-fuel ratio coincides with the target air-fuel ratio, the amount of fuel injection is adjusted through sub-feedback control in accordance with an actual purification state of the exhaust gas purification catalyst 34. As a result, the exhaust gas purification catalyst 34 suitably performs the operation of purification.

A later-described learning process is then performed (step S116). After that, the present process is temporarily terminated. The aforementioned learning process is performed for the following reason.

In the internal combustion engine 10, the passage area of a communication region between the intake passage 12 and the combustion chamber 18 is different from a reference area thereof as a result of an individual difference, an aged deterioration, or a mounting error of the lift amount change mechanism 42, adhesion of deposits to the intake valve 30, or the like. Therefore, even when the lift amount VL of the intake valve 30 is adjusted in the same mode, the actual in-cylinder intake air amount does not coincide with an in-cylinder intake air amount in the case where the aforementioned passage area is equal to the reference area thereof. In this embodiment of the invention, a change in the in-cylinder intake air amount resulting from such a difference in passage area is basically compensated for through the aforementioned adjustment of the air-fuel ratio.

In the case where the aforementioned passage area is different from the reference area thereof, the change in in-cylinder intake air amount resulting from the difference greatly differs depending on the mode of action of the lift amount change mechanism 42 (the lift amount VL). The reason for this phenomenon will be described hereinafter.

Figure 6:
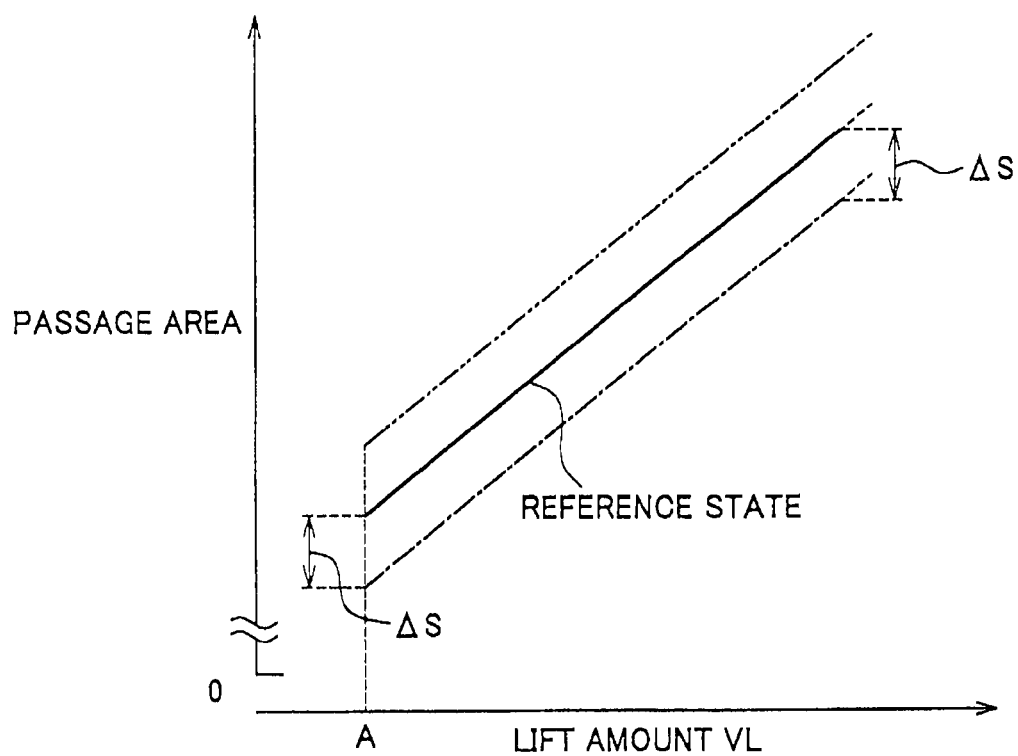
FIG. 6 is a graph showing a relationship between the lift amount of the intake valves and the passage area of a communication region.

FIG. 6 shows a relationship between the lift amount VL of the intake valve 30 and the aforementioned passage area. In FIG. 6, a solid line indicates an example of the relationship in a state where the aforementioned passage area coincides with the reference area thereof (a reference state), alternate long and short dash lines indicate an example of the relationship in a case where the aforementioned passage area is smaller than the reference area thereof, and alternate long and two short dashes lines indicate an example of the relationship in a case where the aforementioned passage area is larger than the reference area thereof.

Figure 7:
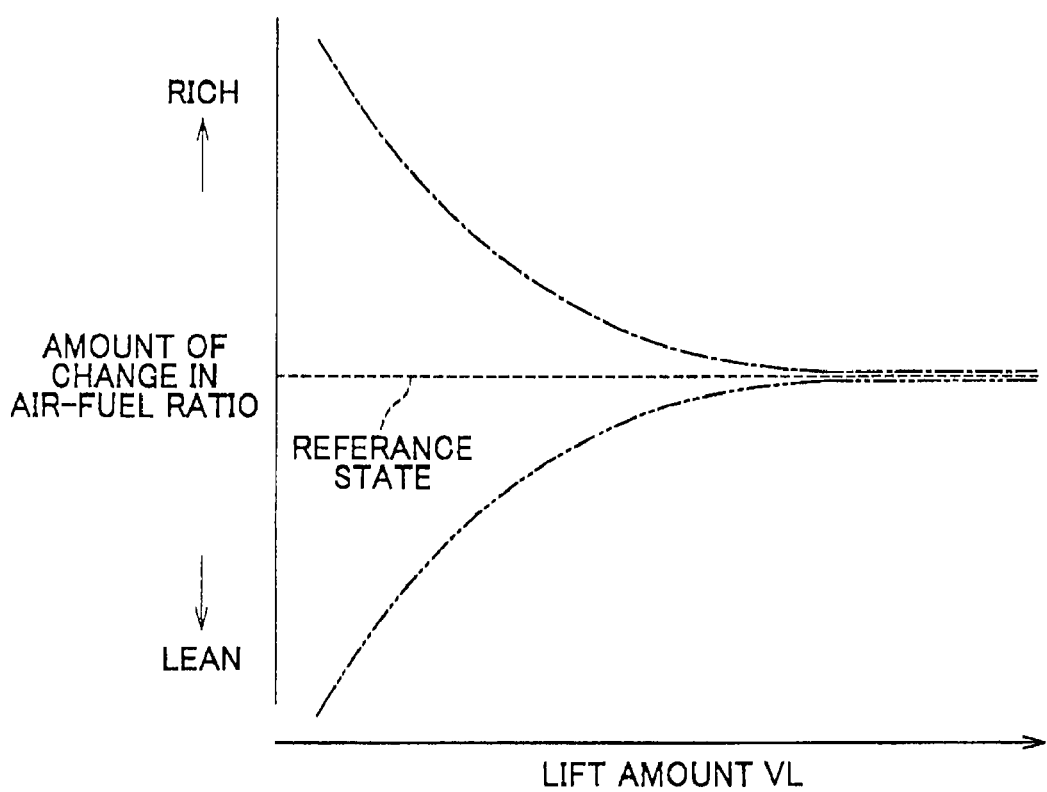
FIG. 7 is a graph showing a relationship between the lift amount of the intake valves and the amount of change in air-fuel ratio.

In this embodiment of the invention, the in-cylinder intake air amount is adjusted by changing the lift amount VL of the intake valve 30. Therefore, at the time of low-load operation of the internal combustion engine 10, for example, idle operation of the internal combustion engine 10, the lift amount VL is set small and the aforementioned passage area is rather small. As is apparent from FIG. 6, the ratio of a difference ΔS between the aforementioned passage area and the reference area thereof to the entire passage area increases as the lift amount VL is set smaller. Accordingly, in the case where the aforementioned passage area is different from the reference area thereof, the influence of this difference more remarkably emerges as the lift amount VL of the intake valve 30 decreases. More specifically, the degree of change in the in-cylinder intake air amount increases as the lift amount VL of the intake valve 30 decreases. Therefore, as shown in FIG. 7, the aforementioned change in air-fuel ratio is large in either of the case where the aforementioned passage area is small (the alternate long and short dash lines in FIG. 7) and the case where the aforementioned passage area is large (the alternate long and two short dashes lines in FIG. 7).

In this embodiment of the invention, the lift amount VL of the intake valve 30 is frequently changed in accordance with the engine operational state at each moment. Therefore, the aforementioned change in air-fuel ratio also frequently changes as the change is made. Thus, even when main feedback control based on the main feedback correction amount MFB or sub-feedback control based on the sub-feedback correction amount SFB is simply performed, it may become impossible to follow such frequent changes in the change in air-fuel ratio and adequately compensate for the change.

In this embodiment of the invention, therefore, a relationship between an amount of divergence of the sub-feedback correction amount SFB from a reference value thereof (more specifically, "0") and the lift amount VL of the intake valve 30 is learned through the aforementioned learning process (step S116 in FIG. 5). The divergence amount correction amount Kvla is then calculated from the learned relationship based on the lift amount VL (step S102 in FIG. 4), and the target injection amount Tq is corrected with the divergence amount correction value Kvla (step S104, and steps S110 and S115 in FIG. 5). The learning process in the invention can be regarded as the learning unit, and the processings of steps S102 and S104 in FIG. 4 and the processings of steps S110 and S115 in FIG. 5 can be regarded as the correction unit.

Figure 8:
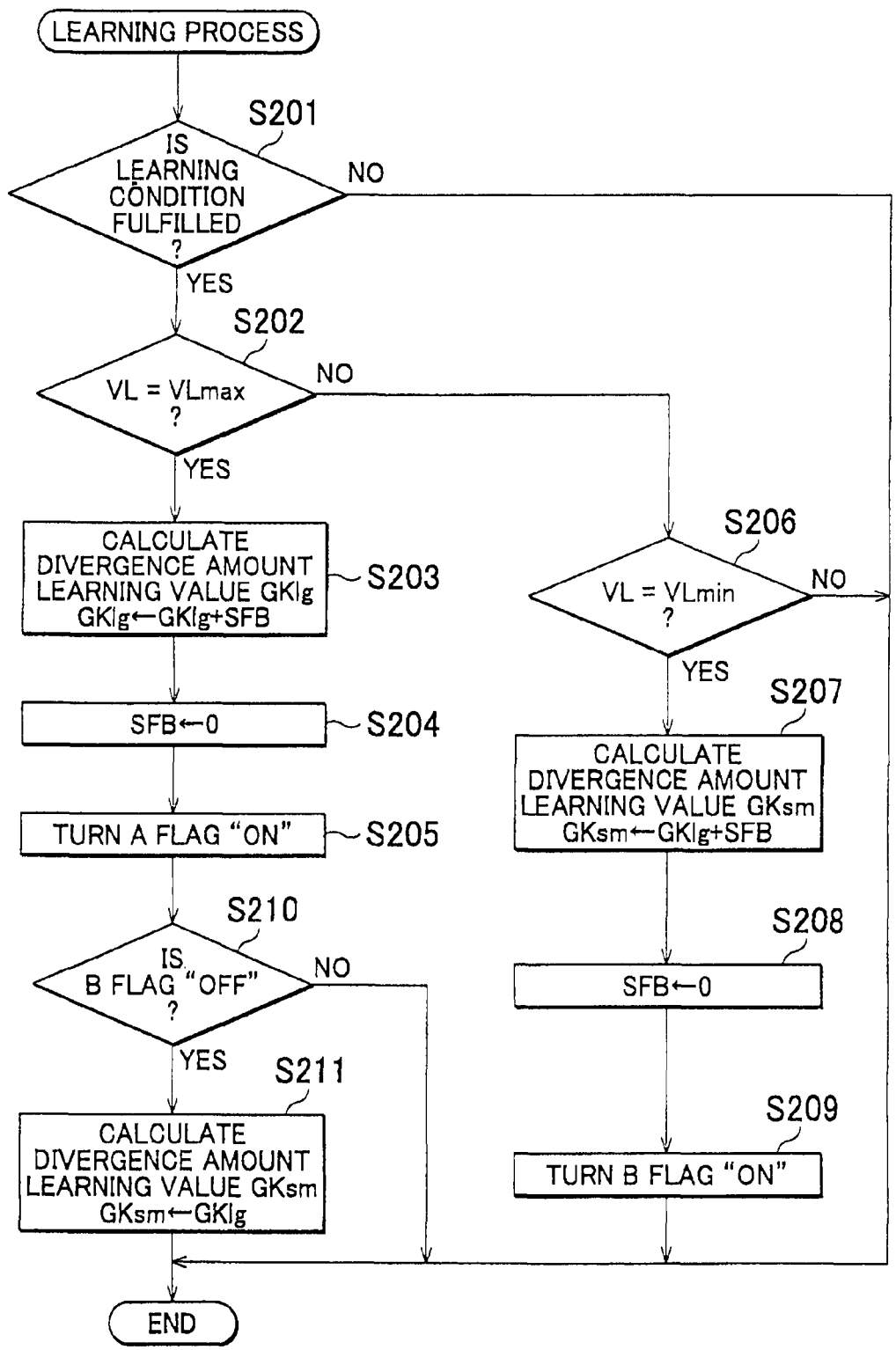
FIG. 8 is a flowchart showing a concrete processing procedure of a learning process according to the first embodiment of the invention.

The aforementioned learning process will be described hereinafter concretely. FIG. 8 is a flowchart showing a concrete processing procedure of the learning process. A series of processings shown in this flowchart are performed by the electronic control unit 50 as a process on a predetermined cycle.

As shown in FIG. 8, first of all in this process, it is determined whether or not a learning condition is fulfilled (step S201). In this case, it is determined that the learning condition is fulfilled, when a stable engine operational state unaccompanied by sudden acceleration or sudden deceleration has continued for a predetermined period.

When the learning condition is fulfilled (step S201: YES), processings of learning the aforementioned divergence amount (steps S202 to S209) are performed. In these processings, the aforementioned divergence amount is learned when the lift amount VL of the intake valve 30 is equal to a control limit lift amount on the large lift amount side (an upper-limit lift amount VLmax) or a control limit lift amount on the small lift amount side (a lower-limit lift amount VLmin). In this case, the upper-limit lift amount VLmax and the lower-limit lift amount VLmin can be regarded as the plurality of the set lift amount regions of the invention. One of the upper-limit lift amount VLmax and the lower-limit lift amount VLmin can be regarded as the first specific lift amount, and the other can be regarded as the second specific lift amount.

More specifically, when the lift amount VL of the intake valve 30 is equal to the upper-limit lift amount VLmax (step S202: YES), a value obtained by adding the sub-feedback correction amount SFB to a divergence amount learning value GKlg stored at this time (GKlg+SFB) is stored as a new, divergence amount learning value GKlg (step S203). After that, the sub-feedback correction amount is reset to "0" (step S204), and an A flag is turned on (step S205). The A flag is turned on when the divergence amount learning value GKlg is learned, and turned off when the respective values stored in the electronic control unit 50, including the divergence amount learning value GKlg, are reset to their initial values respectively, for example, when the supply of power to the electronic control unit 50 is temporarily stopped due to the replacement of the battery.

On the other hand, when the lift amount VL of the intake valve 30 is equal to the lower-limit lift amount VLmin (step S202: NO, and step S206: YES), a value obtained by adding the sub-feedback correction amount SFB to a divergence amount learning value GKsm stored at this time (GKsm+SFB) is stored as a new divergence amount learning value GKsm (step S207). After that, the sub-feedback correction amount is reset to "0" (step S208), and a Y flag is turned on (step S209). The Y flag is turned on when the divergence amount learning value GKsm is learned, and turned off when the respective values stored in the electronic control unit 50, including the divergence amount learning value GKsm, are reset to their initial values respectively. The respective values stored in the electronic control unit 50, including the divergence amount learning value GKsm, are reset to their initial values respectively, for example, when the supply of power to the electronic control unit 50 is temporarily stopped due to the replacement of the battery.

On the other hand, when the lift amount VL of the intake valve 30 is equal to neither the upper-limit lift amount VLmax nor the lower-limit lift amount VLmin (step S202: NO, and step S206: NO), the processings of steps S203 to S205 and the processings of steps S207 to S209 are not performed. That is, the divergence amount learning value GKlg and the divergence amount learning value GKsm are not learned. When the learning condition is not fulfilled (step S201: NO), the divergence amount learning value GKlg and the divergence amount learning value GKsm are not learned either.

The aforementioned processing of calculating the divergence amount correction value Kvla (step S102 of FIG. 4) is performed as follows based on the divergence amount learning value GKlg and the divergence amount learning value GKsm, which are learned through the aforementioned learning process.

Figure 9:
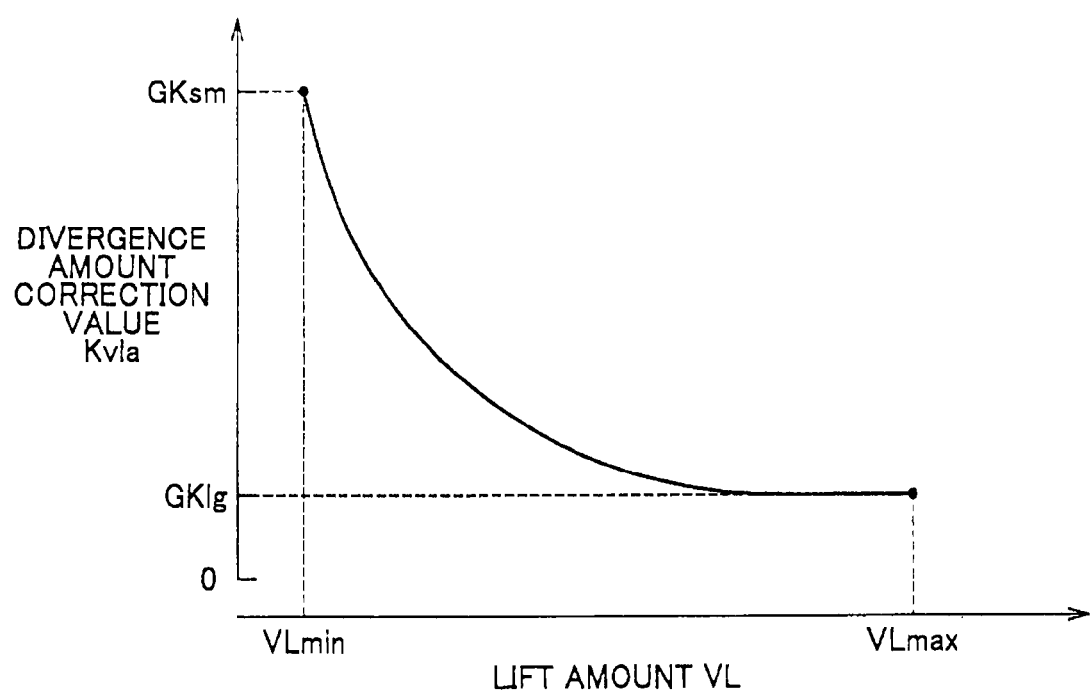
FIG. 9 is a graph showing an example of a relationship between the lift amount of the intake valves and divergence amount correction value in the first embodiment of the invention.

FIG. 9 shows an example of a relationship among the lift amount, VL of the intake valve 30, the divergence amount learning value GKlg, the divergence amount learning value GKsm, and the divergence amount correction value Kvla. As shown in FIG. 9, the divergence amount correction value Kvla is basically calculated as a value that increases as the lift amount VL decreases. More specifically, the divergence amount correction value Kvla is calculated as follows. When the lift amount VL is equal to the lower-limit lift amount VLmin (VL=Vmin), the divergence amount learning value GKsm is calculated as the divergence amount correction value Kvla. When the lift amount VL is within a range that is smaller than the upper-limit lift amount VLmax and larger than the lower-limit lift amount VLmin (VLmin<VL<VLmax), the divergence amount correction value Kvla is calculated based on the relationship between both the lift amounts VLmax and VLmin and the lift amount VL, through the interpolation of the divergence amount learning value GKlg and the divergence amount learning value GKsm. More specifically, this divergence amount correction value Kvla is calculated as a value satisfying the following relational expression, through a preset conversion coefficient K1. The conversion coefficient K1 is set to a positive value equal to or smaller than "1.0" in accordance with the lift amount VL.

$$Kvla=GKlg+\{(GKsm-GKlg) \times K1(VL-VLmax)/(VLmin-VLmax)\}$$

When the lift amount VL is equal to the upper-limit lift amount VLmax (VL=VLmax), the divergence amount learning value GKlg is calculated as the divergence amount correction value Kvla.

An operation resulting from the calculation of the divergence amount correction value Kvla as described above will be described hereinafter. In this embodiment of the invention, the divergence amount correction value Kvla is calculated as a value suited for the lift amount VL of the intake valve 30 at each moment, more specifically, a value that increases as the lift amount VL decreases. Thus, when the passage area of the communication region is different from the reference area thereof, the divergence amount correction value Kvla is calculated in accordance with a tendency that the amount of divergence of the sub-feedback correction amount SFB from the reference value thereof increases as the lift amount VL decreases. The target injection amount Tq is corrected with the divergence amount correction value Kvla thus calculated. Thus, although the lift amount VL of the intake valve 30 is frequently changed through lift amount change control, the target, injection amount Tq is calculated so as to follow a change in the lift amount VL, in such a manner as to foresee a change in air-fuel ratio resulting from the change in the lift amount VL. Thus, the amount of the influence of the change in the lift amount VL on the air-fuel ratio is adequately restricted, and the air-fuel ratio of the mixture is accurately controlled to a desired ratio through the adjustment of the amount of fuel injection through main feedback control, sub-feedback control, or anticipation control.

Besides, the sub-feedback correction amount SFB is increased/reduced by the predetermined amount β on every calculation cycle thereof in accordance with an output signal of the oxygen sensor 66. Therefore, the amount of fuel injection is increased/reduced such that the air-fuel ratio of the mixture becomes equal to a desired air-fuel ratio, through the correction with the sub-feedback correction amount SFB. Thus, the amount of fuel injection is increased/reduced in accordance with the state of the purification operation of the exhaust gas purification catalyst 34. As a result, the purification operation is effectively utilized.

The internal combustion engine 10 according to this embodiment of the invention is a multi-cylinder internal combustion engine. Therefore, the air-fuel ratio of the mixture is inevitably dispersed among the cylinders as a result of the individual difference of the fuel injection valve 20, the adhesion of deposits to the intake valve 30, or the like. In this embodiment of the invention, the air-fuel ratio 64 provided to detect the air-fuel ratio of the mixture in each of the cylinders is common to all the cylinders. Therefore, the mode of abutment of exhaust gas on this air-fuel ratio sensor 64 differs among the cylinders.

Figure 10:
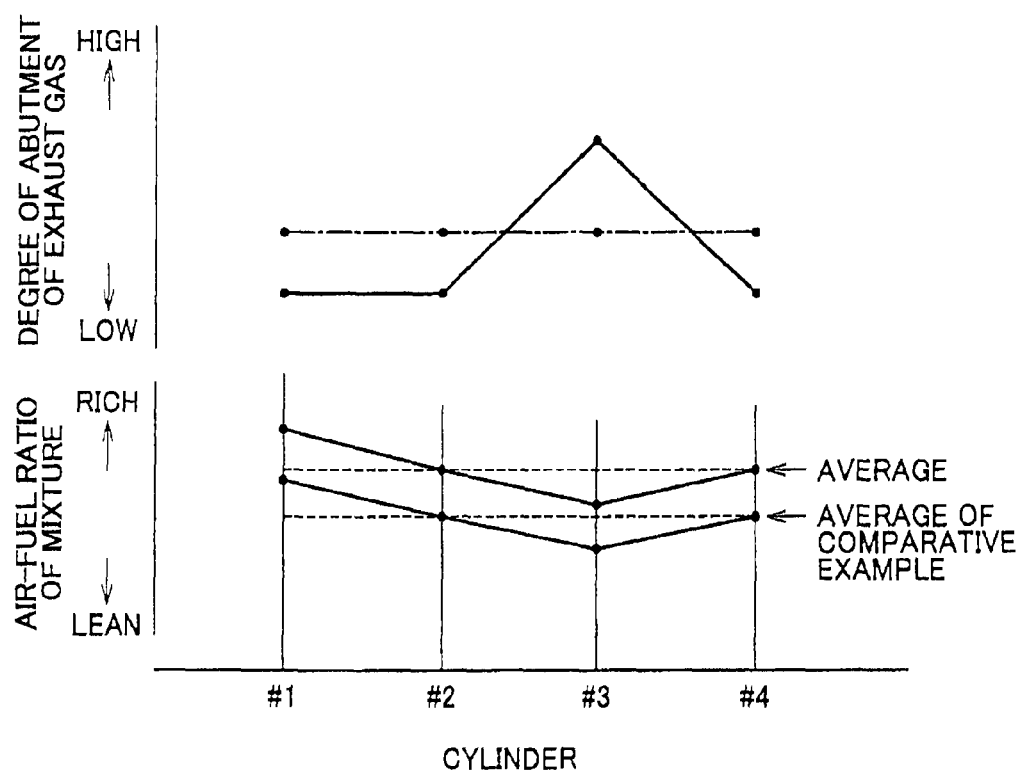
FIG. 10 is a schematic diagram showing the degrees of abutment of exhaust gas on the air-fuel ratio sensor and the properties of exhaust gas for respective cylinders.

Thus, when the target injection amount Tq is corrected in an increasing/decreasing manner based on the output signal of the air-fuel ratio sensor 64, the aforementioned dispersion of the air-fuel ratio among the cylinders deteriorates the accuracy in adjusting the properties of exhaust gas upstream of the exhaust gas purification catalyst 34 to properties corresponding to a ratio in the neighborhood of the theoretical air-fuel ratio. More specifically, as indicated by solid lines in FIG. 10, in the case where, for, example, the internal combustion engine is structured such that exhaust gas in a specific one of the cylinders (#3 in the example shown in FIG. 10) is more likely to abut on the air-fuel ratio sensor 64 than exhaust gas in any other one of the cylinders (#1, #2, and #4 in the example shown in FIG. 10) and the exhaust gas in the specific one of the cylinders #3 demonstrates properties corresponding to leanness, the target injection amount Tq is excessively corrected in an increasing direction, and the average of the air-fuel ratio of the mixture becomes rich. As a comparative example, alternate long and short dash lines in FIG. 10 indicate degrees of abutment of exhaust gas and air-fuel ratios of the mixture in the respective cylinders in the case where the modes of abutment of exhaust gas on the air-fuel ratio sensor 64 in the respective cylinders coincide with one another.

Accordingly, in the apparatus according to this embodiment of the invention, the difference between the output value of the oxygen sensor 66 provided downstream of the exhaust gas purification catalyst 34 and the reference value thereof (the value corresponding to the concentration of oxygen in exhaust gas in the case where the air-fuel ratio of the mixture is equal to the theoretical air-fuel ratio), and hence the aforementioned change in air-fuel ratio resulting from the change in the lift amount VL are likely to become large. According to this embodiment of the invention, the air-fuel ratio of the mixture can be accurately controlled to a desired ratio in the apparatus applied to the multi-cylinder internal combustion engine 10.

In the aforementioned fuel injection control, a linear function where the amount of the correction with the divergence amount correction value Kvla increases as the lift amount VL of the intake valve 30 decreases is preset (see FIG. 9) as a function defined by the lift amount VL, the divergence amount learning value GKlg, the divergence amount learning value GKsm, the divergence amount correction value Kvla, and the conversion coefficient K1. The aforementioned relationship between the lift amount of the intake valve 30 and the divergence amount is then learned so as to change the gradient of the function in accordance with the divergence amount at the time when the lift amount VL of the intake valve 30 is equal to the lower-limit lift amount VLmin or the upper-limit lift amount VLmax. Therefore, the divergence amount correction value Kvla can be calculated with a lower learning frequency and over a wider lift amount region than in the configuration in which the lift amount regions are finely set and the aforementioned divergence amount is calculated for each of those regions to be stored as the divergence amount learning value.

In the apparatus according to this embodiment of the invention, if adequate values are learned as the divergence amount learning values GKlg and GKsm, the air-fuel ratio of the mixture is accurately controlled to the desired ratio as described above, and the properties of exhaust gas is adequately restrained from deteriorating. However, when the divergence amount learning values GKlg and GKsm are initialized through the replacement of the battery or the like, the performance of main feedback control and sub-feedback control is started after the starting of the internal combustion engine 10. In addition, the properties of exhaust gas deteriorate over a long period until the divergence amount learning values GKlg and GKsm are learned to become equal to realistic values.

In this light, according to this embodiment of the invention, the divergence amount learning value GKlg is appropriated as the divergence amount learning value GKsm when there is a history indicating that the divergence amount learning value GKlg has been learned and there is no history indicating that the divergence amount learning value GKsm has been learned.

More specifically, as shown in FIG. 8, when the A flag is turned on (step S205) and a B flag is turned off (step S210: YES), a value stored as the divergence amount learning value GKlg is also stored as the divergence amount learning value GKsm (step S211). When the B flag is turned on (step S210: NO), the processing of step S211 is not performed. The processings of steps S210 and S211 can be regarded as the reflection unit in the invention.

Figure 11:
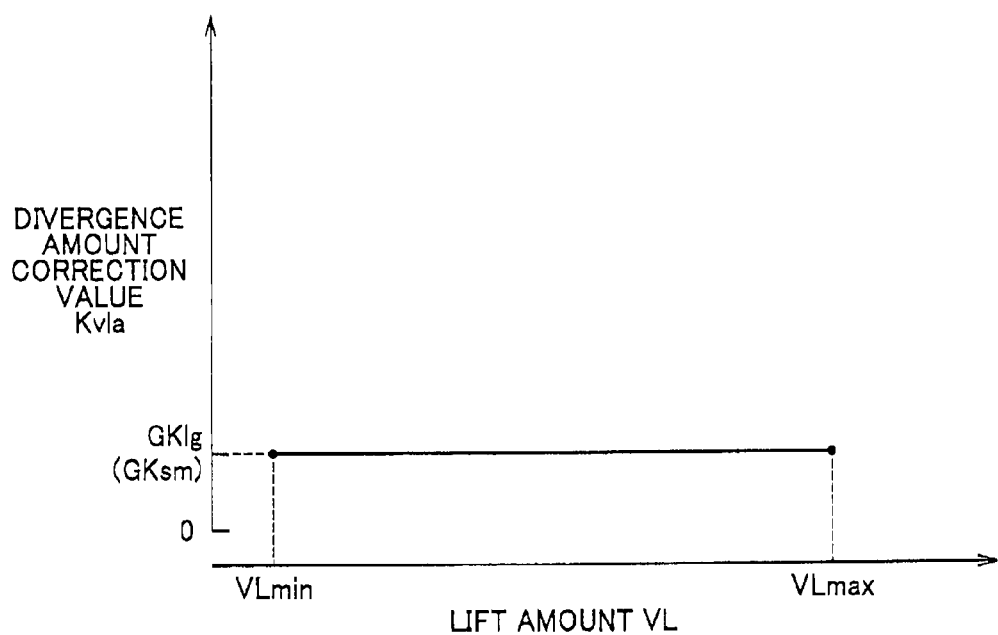
FIG. 11 is a graph showing another example of the relationship between the lift amount of the intake valves and divergence amount correction value in the first embodiment of the invention.

FIG. 11 shows an example of a relationship among the lift amount VL of the intake valve 30, the divergence amount learning value GKlg, the divergence amount learning value GKsm, and the divergence amount correction value Kvla in the case where the divergence amount learning value GKlg is appropriated as the divergence amount learning value GKsm. In this case, as shown in FIG. 11, a constant value is calculated as the divergence amount correction value Kvla regardless of the lift amount VL of the intake valve 30.

An operation resulting from the appropriation of the divergence amount learning value GKlg as the divergence amount learning value GKsm as described above will be described hereinafter. In the case where the passage area of the communication region between the intake passage 12 and the combustion chamber 18 is different from the reference area thereof due to the mounting error of the intake valve 30 or the adhesion of deposits to the intake valve 30, the amount of divergence of the correction amount in sub-feedback control ("the divergence amount learning value Kvla"+"the sub-feedback correction amount SFB") from the reference value thereof (more specifically, "0") increases as the lift amount VL of the intake valve 30 decreases. Therefore, a value with which the target injection amount Tq is corrected to a larger amount is learned as the divergence amount learning value GKsm learned at the time when the lift amount VL of the intake valve 30 is equal to the lower-limit lift amount VLmin than as the divergence amount learning value GKlg learned at the time when the lift amount VL of the intake valve 30 is equal to the upper-limit lift amount VLmax (see FIG. 9). Accordingly, even when the divergence amount learning value GKlg is appropriated as the divergence amount learning value GKsm, the amount of the correction with the divergence amount learning value GKsm is unlikely to become excessively large. When the divergence amount learning value GKsm is appropriated as the divergence amount learning value GKlg, the amount of the correction with the divergence amount learning value GKlg is likely to become excessively large.

When the lift amount VL of the intake valve 30 is equal to the upper-limit lift amount VLmax, the amount of an error resulting from the difference between the passage area of the communication region and the reference area thereof is rather small. Therefore, the divergence amount learning value GKlg learned at this time can mainly compensate for amounts of error resulting from factors other than the difference between the passage area of the communication region and the reference area thereof, such as an amount of error resulting from the individual difference of the fuel injection valve 20, an amount of error resulting from an aged deterioration, and the like. Accordingly, the amounts of error resulting from factors other than the difference between the passage area of the communication region and the reference area thereof can be compensated for regardless of the lift amount VL of the intake valve 30 by appropriating the divergence amount learning value GKlg as the divergence amount learning value GKsm.

For this reason, the divergence amount learning value GKsm can be changed so as to approach a realistic value by appropriating the divergence amount learning value GKlg as the divergence amount learning value GKsm when the divergence amount learning value GKlg has been learned. Accordingly, the period in which the divergence amount learning value GKsm is held at the initial value, that is, a value significantly different from the realistic value can be shortened. Thus, the properties of exhaust gas can be restrained from deteriorating until the respective divergence amount learning values GKlg and GKsm are learned to become equal to realistic values.

The divergence amount learning value GKsm can be changed in advance so as to approach a realistic value when the divergence amount learning value GKsm has not been learned. Therefore, in comparison with the apparatus in which the divergence amount learning value GKsm is held at the initial value without being changed, the amount of correction in sub-feedback control ("the divergence amount correction value Kvla"+"the sub-feedback correction amount SFB") can be changed earlier to a realistic value, and the divergence amount learning value GKsm can be changed earlier to a realistic value in learning the divergence amount learning value GKsm.

As described above, according to this embodiment of the invention, the effects described below are obtained. (1) The amount of divergence of the sub-feedback correction amount SFB from the reference value thereof can be learned in accordance with the lift amount VL of the intake valve 30 and used to calculate the target injection amount Tq. Therefore, after the respective divergence amount learning values GKlg and GKsm are learned, the air-fuel ratio of the mixture can be adjusted to a desired ratio while restricting the amount of the influence of the difference in the mode of action of the lift amount change mechanism 42 on the air-fuel ratio through the correction in an increasing/decreasing manner with the divergence amount correction value Kvla. As a result, the properties of exhaust gas can be restrained from deteriorating. Besides, when the divergence amount learning value GKlg is learned in a situation where the respective divergence amount learning values GKlg and GKsm have not been learned, the divergence amount learning value GKlg is appropriated as the, divergence amount learning value GKsm. Therefore, the divergence amount learning value GKsm can also be changed so as to approach a realistic value. Accordingly, the period in which the divergence amount learning value GKsm is held at the initial value, that is, a value significantly different from the realistic value can be shortened. Thus, the properties of exhaust gas can also be restrained from deteriorating until the respective divergence amount learning values GKlg and GKsm are learned to become equal to realistic values.

(2) The learned divergence amount learning value can be appropriated as the unlearned divergence amount learning value only when the amount of the correction with the divergence amount learning value is unlikely to become excessively large. Thus, the unlearned divergence amount learning value can be changed to a suitable value.

The second embodiment of the invention will be described focusing on what is different from the first embodiment of the invention.

The second embodiment of the invention is different from the first embodiment of the invention in the mode of calculating the divergence amount correction value and the mode of performing the learning process. In this embodiment of the invention, as shown in FIG. 12, a plurality of learning regions (a region 1 (VL>VL1), a region 2 (VL1≧VL>VL2), a region 3 (VL2≧VL>VL3), and a region 4 (VL3≧VL)) are designated as to the lift amount of the intake valve 30. Divergence amount learning values GK (GK1, GK2, GK3, and GK4) are set respectively for those learning regions.

In a fuel injection control process according to this embodiment of the invention, the processing of calculating a divergence amount correction value Kvlb (the processing corresponding to step S102 of FIG. 4) is performed by selecting one of the aforementioned plurality of the learning regions based on the lift amount VL and calculating that one of the divergence amount learning values GK which corresponds to the selected one of the learning regions as the divergence amount correction value Kvlb.

The processing of calculating the target injection amount Tq (the processing corresponding to step S104 of FIG. 4 and the processings corresponding to steps S110 and S115 of FIG. 5) is performed based on the divergence amount correction value Kvlb.

In the fuel injection control process according to this embodiment of the invention, the processings other than those of calculating the divergence amount correction value Kvlb and calculating the target injection amount Tq are performed in the same manner as in the fuel injection control process according to the first embodiment of the invention.

Figure 13:
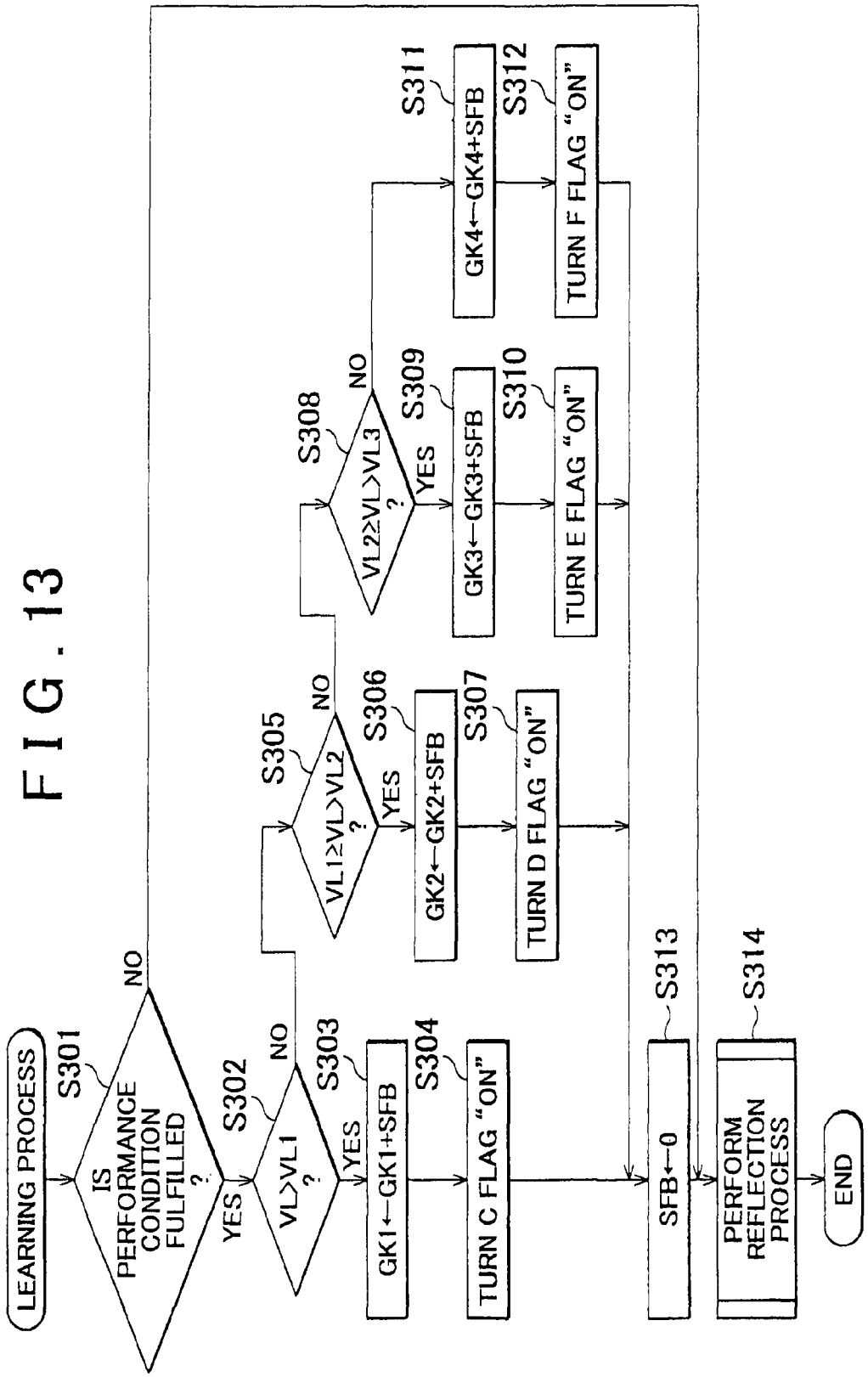
FIG. 13 is a flowchart showing a concrete processing procedure of a learning process according to the second embodiment of the invention.

On the other hand, the learning process according to this embodiment of the invention is performed as follows. FIG. 13 is a flowchart showing a concrete processing procedure of the learning process according to the second embodiment of the invention. A series of processings shown in the flowchart are performed by the electronic control unit 50 as a process on a predetermined cycle. This learning process can be regarded as the learning unit in the invention.

As shown in FIG. 13, first of all in this process, it is determined whether or not the learning condition is fulfilled (step S301). In this case, it is determined that the learning condition is fulfilled, when a stable engine operational state unaccompanied by sudden acceleration or sudden deceleration has continued for a predetermined period.

When the learning condition is fulfilled (step S301: YES), the processings of learning the divergence amount learning value GK (steps S302 to S313) are performed. More specifically, when the lift amount VL of the intake valve 30 is in the region 1 (step S302: YES), a value obtained by adding the sub-feedback correction amount SFB to the divergence amount learning value GK1 stored at this time (GK1+SFB) is stored as the new divergence amount learning value GK1 (step S303), and a C flag is turned on (step S304).

When the lift amount VL of the intake valve 30 is in the region 2 (step S302: NO and step S305: YES), a value obtained by adding the sub-feedback correction amount SFB to the divergence amount learning value GK2 stored at this time (GK2+SFB) is stored as the new divergence amount learning value GK2 (step S306). In accordance with this storage, a D flag is turned on (step S307).

When the lift amount VL of the intake valve 30 is in the region 3 (step S302: NO, step S305: NO, and step S308: YES), a value obtained by adding the sub-feedback correction amount SFB to the divergence amount learning value GK3 stored at this time (GK3+SFB) is stored as the new divergence amount learning value GK3 (step S309). In accordance with this storage, an E flag is turned on (step S310).

When the lift amount VL of the intake valve 30 is in the region 4 (step S302: NO, step S305: NO, and step S308: NO), a value obtained by adding the sub-feedback correction amount SFB to the divergence amount learning value GK4 stored at this time (GK4+SFB) is stored as the new divergence amount learning value GK4 (step S311). In accordance with this storage, an F flag is turned on (step S312).

The C flag, the D flag, the E flag, and the F flag are all turned off when the respective values stored in the electronic control unit 50, including the divergence amount learning value GK, are reset to the initial values, for example, when the supply of power to the electronic control unit 50 is temporarily stopped through the replacement of the battery. In this embodiment of the invention, it is determined, based on the mode of the turning of each of the flags (the C flag, the D flag, the E flag, and the F flag), whether or not there is a history indicating that a corresponding one of the divergence amount learning values (GK1, GK2, GK3, and GK4) has been learned. More specifically, it is determined in response to the turning on of a certain one of the flags that there is a history indicating that the divergence amount learning value corresponding to that one of the flags has been learned, and it is determined in response to the turning off of a certain one of the flags that there is no history indicating that the divergence amount learning value corresponding to that one of the flags has been learned. The C flag, the D flag, the E flag, and the F flag correspond to the divergence amount learning values GK1, GK2, GK3, and GK4 respectively.

When the divergence amount learning value GK in one of the regions is learned/stored as described above, the sub-feedback correction amount is reset to "0" (step S313), and a later-described reflection process is performed (step S314). After that, the present process is temporarily terminated.

When the learning condition is not fulfilled (step S301: NO), the processings of learning the divergence amount learning value GK (steps S302 to S313) are not performed, and the aforementioned reflection process is performed (step S314). After that, the present process is temporarily terminated.

An operation resulting from the performance of the fuel injection control process according to this embodiment of the invention, including the learning process as described above, will be described hereinafter. In the fuel injection control according to this embodiment of the invention, the relationship between the amount of divergence of the sub-feedback correction amount SFB from the reference value thereof and the lift amount VL of the intake valve 30 is learned, and the divergence amount correction value Kvlb is calculated from the learned relationship based on the lift amount VL. More specifically, the plurality of the learning regions (the regions 1 to 4) are set as to the lift amount VL of the intake valve 30, and the divergence amount learning values GK (GK1 to GK4) are learned/stored respectively for those regions. One of the plurality of the regions 1 to 4 is then selected based on the lift amount VL, and that one of the divergence amount learning values GK which corresponds to the selected one of the learning regions is calculated as the divergence amount correction value Kvlb.

Thus, a value corresponding to a tendency that the amount of divergence of the sub-feedback correction amount SFB from the reference value thereof increases with decreases in the lift amount VL when the passage area of the communication region is different from the reference area thereof, more specifically, a value with which the target injection amount Tq is corrected to a value that increases as the lift amount VL decreases is calculated as the divergence amount correction value Kvlb. The target injection amount Tq is then corrected with the divergence amount correction value Kvlb thus calculated.

Accordingly, although the lift amount VL of the intake valve 30 is frequently changed through lift amount change control, the target injection amount Tq is calculated so as to follow a change in the lift amount VL, in such a manner as to foresee a change in air-fuel ratio resulting from the change in the lift amount VL. Thus, the amount of the influence of the change in the lift amount VL on the air-fuel ratio is adequately restricted, and the air-fuel ratio of the mixture is accurately controlled to a desired ratio through the adjustment of the amount of fuel injection according to main feedback control, sub-feedback control, or anticipation control.

In the apparatus according to this embodiment of the invention, if suitable values are learned as the respective divergence amount learning values GK1 to GK4, the air-fuel ratio of the mixture is accurately controlled to a desired ratio as described above, and the properties of exhaust gas are suitably restrained from deteriorating. However, when the respective divergence amount learning values GK1 to GK4 are initialized through the replacement of the battery or the like, the performance of main feedback control and sub-feedback control is started after the starting of the internal combustion engine 10. In addition, the properties of exhaust gas deteriorate over a long period until the respective divergence amount learning values GK1 to GK4 are learned to become equal to realistic values.

In this light, according to this embodiment of the invention, the divergence amount learning value of a specific one of the lift amount regions is appropriated as the divergence amount learning value of another one of the lift amount regions when there is a history indicating that the divergence amount learning value of the specific one of the lift amount regions has been learned and there is no history indicating that the divergence amount learning value of that another one of the lift amount regions has been learned. This appropriation of the divergence amount learning value is carried out on the condition that that one of the lift amount regions in which there is no history indicating that the divergence amount learning value has been learned be located on the small lift amount side with respect to that one of the lift amount regions in which there is a history indicating that the divergence amount learning value has been learned. In this embodiment of the invention, a series of processings for appropriating the divergence amount learning value as described above are performed through the aforementioned appropriation process (step S314 of FIG. 13). The aforementioned appropriation process can be regarded as the reflection unit in the invention.

A concrete mode of appropriation in the case where the aforementioned appropriation of the divergence amount learning value is carried out will be described hereinafter for each situation with reference to FIG. 14. In a ⟨situation i⟩ where the divergence amount learning value GK1 of the region 1 has been learned (the C flag="on") and the divergence amount learning values GK2 to GK4 of the regions 2 to 4 have not been learned (the D flag, the E flag, and the F flag="off"), the divergence amount learning, value GK1 is appropriated as the respective divergence amount learning values GK2 to GK4. In a ⟨situation ii⟩ where the divergence amount learning values GK1 and GK2 of the regions 1 and 2 have been learned (the C flag and the D flag="on") and the divergence amount learning values GK3 and GK4 of the regions 3 and 4 have not been learned (the E flag and the F flag="off"), the divergence amount learning value GK2 is appropriated as the respective divergence amount learning values GK3 and GK4. In a ⟨situation iii⟩ where the divergence amount learning values GK1, GK2, and GK3 of the regions 1 to 3 have been learned (the C flag, the D flag, and the E flag="on") and the divergence amount learning value GK4 of the region 4 has not been learned (the F flag="off"), the divergence amount learning value GK3 is appropriated as the divergence amount learning value GK4. In a ⟨situation iv⟩ where the divergence amount learning values GK1, GK2, and GK4 of the regions 1, 2, and 4 have been learned (the C flag, the D flag, and the F flag="on") and the divergence amount learning value GK3 of the region 3 has not been learned (the E flag="off"), the divergence amount learning value GK2 is appropriated as the divergence amount learning value GK3.

In a ⟨situation v⟩ where the divergence amount learning values GK1 and GK3 of the regions 1 and 3 have been learned (the C flag and the E flag="on") and the divergence amount learning values GK2 and GK4 of the regions 2 and 4 have not been learned (the D flag and, the F flag="off"), the divergence amount learning value GK1 is appropriated as the divergence amount learning value GK2, and the divergence amount learning value GK3 is appropriated as the divergence amount learning value GK4. In a (situation vi) where the divergence amount learning values GK1 and GK4 of the regions 1 and 4 have been learned (the C flag and the F flag="on") and the divergence amount learning values GK2 and GK3 of the regions 2 and 3 have not been learned (the D flag and the E flag="off"), the divergence amount learning value GK1 is appropriated as the respective divergence amount learning values GK2 and GK3. In a (situation vii) where the divergence amount learning values GK1, GK3, and GK4 of the regions 1, 3, and 4 have been learned (the C flag, the E flag, and the F flag="on") and the divergence amount learning value GK2 of the region 2 has not been learned (the D flag="off"), the divergence amount learning value GK1 is appropriated as the divergence amount learning value GK2.

In this embodiment of the invention, no divergence amount learning value is appropriated in a situation other than the aforementioned (situations i to vii), for example, in a (situation viii) where there is a history indicating that all the respective divergence amount learning values GK1 to GK4 have been learned.

An operation resulting from the appropriation of the divergence amount learning values as described above will be described hereinafter. In the case where the passage area of the communication region between the intake passage 12 and the combustion chamber 18 is different from the reference area thereof due to the mounting error of the intake valve 30 or the adhesion of deposits to the intake valve 30, the amount of divergence of the correction amount in sub-feedback control ("the divergence amount correction value Kvlb"+"the sub-feedback correction amount SFB") from the reference value thereof (more specifically "0") increases as the lift amount VL of the intake valve 30 decreases.

Thus, the target injection amount Tq, which is corrected with a value learned as the divergence amount learning value, increases as the learning region is shifted toward the small lift amount side. Accordingly, even when the divergence amount learning value of a lift amount region on the large lift amount side is appropriated as the divergence amount learning value of a lift amount region on the small lift amount side, the amount of the correction with the divergence amount learning value of the lift amount region on the small lift amount side is unlikely to become excessively large. When the divergence amount learning value of a lift amount region on the small lift amount side is appropriated as the divergence amount learning value of a lift amount region on the large lift amount side, the amount of the correction with the divergence amount learning value of the lift amount region on the large lift amount side is likely to become excessively large.

In this embodiment of the invention, when there is a history indicating that a specific one of the divergence amount learning values (hereinafter "G") has been learned and there is no history indicating that another one of the divergence amount learning values (hereinafter "H") has been learned, the divergence amount learning value G is appropriated as the divergence amount learning value H on the condition that the lift amount region corresponding to the divergence amount learning value H be located on the small lift amount side with respect to the lift amount region corresponding to the divergence amount learning value G. Therefore, the unlearned divergence amount learning value H can be changed so as to approach a realistic value. Accordingly, the period in which one of the divergence amount learning values GK1 to GK4 is held at the initial value, that is, a value significantly different from the realistic value can be shortened. Thus, the properties of exhaust gas can be restrained from deteriorating until all the divergence amount learning values GK1 to GK4 are learned to become equal to realistic values.

The unlearned divergence amount learning value H can be changed in advance so as to approach a realistic value. Therefore, in comparison with the apparatus in which the divergence amount learning value H is held at the initial value without being changed, the amount of correction in sub-feedback control ("the divergence amount correction value Kvlb"+"the sub-feedback correction amount SFB") can be changed earlier to a realistic value, and the divergence amount learning value H can be changed earlier to the realistic value in learning the divergence amount learning value H.

As described above, according to this embodiment of the invention, the effects described below are obtained. (1) The amount of divergence of the sub-feedback correction amount SFB from the reference value thereof can be learned in accordance with the lift amount VL of the intake valve 30 and used to calculate the target injection amount Tq. Therefore, after the respective divergence amount learning values GK1 to GK4 are learned, the air-fuel ratio of the mixture can be adjusted to a desired ratio while restricting the amount of the influence of the difference in the mode of action of the lift amount change mechanism 42 on the air-fuel ratio through the correction in an increasing/decreasing manner with the divergence amount correction value Kvlb. As a result, the properties of exhaust gas can be restrained from deteriorating. Besides, even in the case where all the divergence amount learning values GK1 to GK4 have not been learned, when there is a history indicating that the specific one of the divergence amount learning values G has been learned and there is no history indicating that that another one of the divergence amount learning values H has been learned during subsequent operation of the engine, the divergence amount learning value G is appropriated as the divergence amount learning value H. Therefore, the divergence amount learning value H can also be changed so as to approach the realistic value. Accordingly, the period in which one of the divergence amount learning values GK1 to GK4 is held at the initial value, that is, a value significantly different from a realistic value can be shortened. Thus, the properties of exhaust gas can also be restrained from deteriorating until all the divergence amount learning values GK1 to GK4 are learned to become equal to realistic values.

(2) The learned divergence amount learning value G can be appropriated as the unlearned divergence amount learning value H only when the amount of the correction with the divergence amount learning value is unlikely to become excessively large. Thus, the divergence amount learning value G can be changed to a suitable value.

In the first embodiment of the invention, the divergence amount correction value may also be calculated as described below in (ix) and (x).

Figure 15:
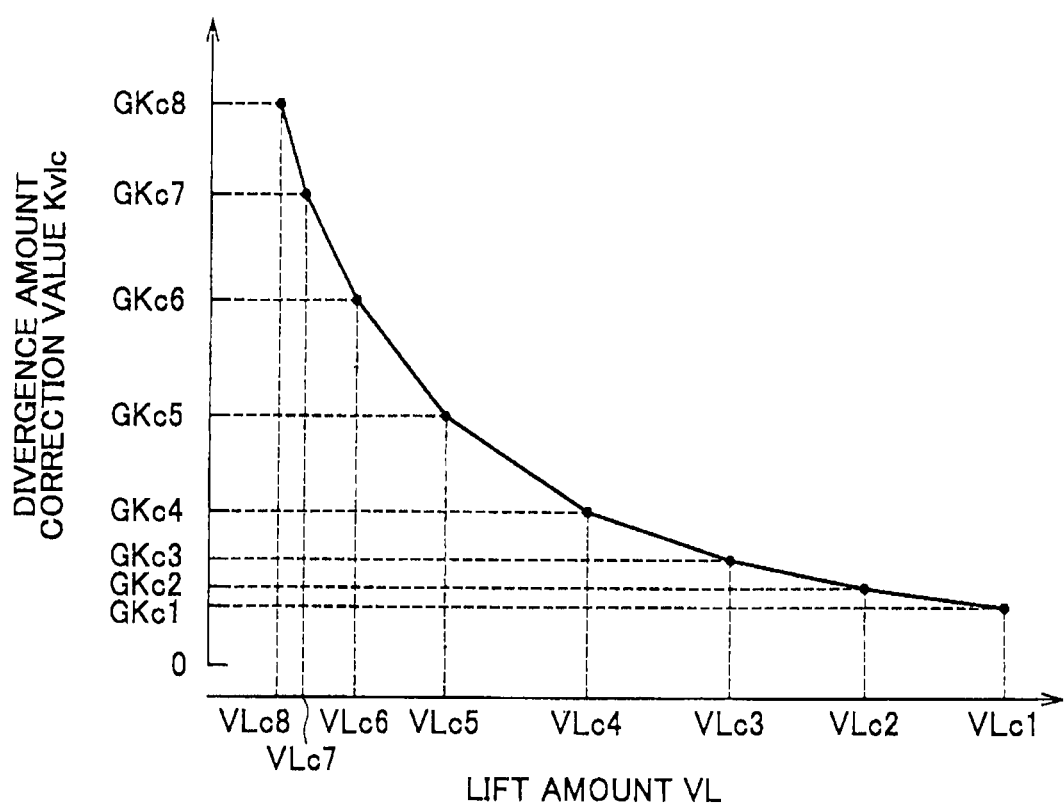
FIG. 15 is a graph showing a relationship between the lift amount of the intake valves and divergence amount correction value in another embodiment of the invention.

(ix) FIG. 15 shows an example of a relationship between the lift amount VL of the intake valve 30 and a divergence amount correction value Kvlc. A plurality of specific lift amounts (VLc1(=VLmax), VLc2, VLc3, . . . VLcn (=VLmin)) are calculated from FIG. 15. The amounts of divergence at the time when the lift amount VL of the intake valve 30 is equal to the plurality of the specific lift amounts are learned as divergence amount learning values GKc (GKc1, GKc2, GKc3, . . . GKcn) respectively. FIG. 15 shows an example in which the eight specific lift amounts VLc1 to VLc8 are set. When the lift amount V is equal to one of the plurality of the specific lift amounts, the divergence amount learning value GKc corresponding to that one of the specific lift amounts is calculated as the divergence amount correction value Kvlc. On the other hand, when the lift amount VL is equal to none of the plurality of the specific lift amounts, the divergence amount correction value Kvlc is calculated through linear interpolation of both the divergence amount learning values corresponding to those of the specific lift amounts which sandwich the lift amount VL at each moment, based on a relationship between that lift amount VL and those of the specific lift amounts which sandwich the lift amount VL.

In the apparatus adopting this configuration, a specific one of the divergence amount learning values (hereinafter "J") may be appropriated as another one of the divergence amount learning values (hereinafter "K") on the condition that the specific lift amount corresponding to the divergence amount learning value K be located on the small lift amount side with respect to the specific lift amount corresponding to the divergence amount learning value J.

(x) FIG. 16 shows an example of a relationship between the lift amount VL of the intake valve 30 and a divergence amount correction value Kvld. As shown in FIG. 16, when the lift amount VL is equal to the upper-limit lift amount VLmax, the divergence amount learning value GKlg is calculated as the divergence amount correction value Kvld. On the other hand, when the lift amount VL is equal to the lower-limit lift amount VLmin, the divergence amount learning value GKsm is calculated as the divergence amount correction value Kvld as shown in FIG. 16. When the lift amount VL is equal to neither the upper-limit lift amount VLmax nor the lower-limit lift amount VLmin, the divergence amount correction value Kvld is calculated through linear interpolation of the divergence amount learning values GKlg and GKsm based on a relationship among the lift amount VL, the upper-limit lift amount VLmax, and the lower-limit lift amount VLmin at each moment.

In the first embodiment of the invention, instead of learning the divergence amount at the time when the lift amount VL of the intake valve 30 is equal to the lower-limit lift amount VLmin, the divergence amount at the time when the lift amount VL of the intake valve 30 is equal to a lift amount other than the lower-limit lift amount VLmin, for example, a lift amount (specific lift amount) slightly larger than the lower-limit lift amount VLmin may be learned. Instead of learning the divergence amount at the time when the lift amount VL of the intake valve 30 is equal to the upper-limit lift amount VLmax, the divergence amount at the time when the lift amount VL of the intake valve 30 is equal to a lift amount other than the upper-limit lift amount VLmax, for example, a lift amount (specific lift amount) slightly smaller than the upper-limit lift amount VLmax may be learned. In this configuration, the divergence amount correction value may be calculated using extrapolation as a method of the interpolation in a region where the lift amount VL is smaller than the aforementioned specific lift amount on the small lift side or in a region where the lift amount VL is larger than the aforementioned specific lift amount on the large lift amount side.

In the first embodiment of the invention, the divergence amount correction value is calculated through the interpolation of the respective divergence amount learning values GKlg and GKsm based on the relationship among the upper-limit lift amount VLmax, the lower-limit lift amount VLmin, and the lift amount VL. Instead of making this calculation, it is also adequate to preset a map defining a relationship between the lift amount VL and the divergence amount correction value and calculate the divergence amount correction value from the map based on the lift amount VL. In this configuration, when the divergence amount learning value GKlg (or GKsm) is learned, it is adequate to change respective values stored in the aforementioned map to values suited for the divergence amount learning value GKlg (or GKsm) in accordance with the learning thereof.

In the second embodiment of the invention, the divergence amount learning value may be appropriated in a situation other than the (situations i to vii), for example, when the divergence amount learning value GK1 of the region 1 has not been learned. In the case where the divergence amount learning value G is appropriated as the divergence amount learning value H, it is adequate that the lift amount region corresponding to the divergence amount learning value H be located on the small lift amount side with respect to the lift amount region corresponding to the divergence amount learning value G.

In the second embodiment of the invention, five or more regions may be set as learning regions. Alternatively, only three or two regions can also be set as learning regions.

In each of the embodiments of the invention, instead of appropriating the learned divergence amount learning value (hereinafter "L") as the unlearned divergence amount learning value (hereinafter "M"), it is also adequate to reflect a learning result of the divergence amount learning value L on the divergence amount learning value M. For details, it is adequate to store as the divergence amount learning value M a value obtained by changing the divergence amount learning value L so as to match the tendency that the amount of the error resulting from the difference between the passage area of the communication region and the reference area thereof increases as the lift amount VL of the intake valve 30 decreases. More specifically, it is adequate to reflect the learning result of the divergence amount learning value L on the divergence amount learning value M such that the amount of the correction with the divergence amount learning value increases as the divergence amount learning value is shifted toward the small lift amount side.

Each of the embodiments of the invention is also applicable, with its configuration suitably modified, to an apparatus in which the relationship between the amount of divergence of the main feedback correction amount MFB from the reference value thereof and the lift amount VL of the intake valve 30 is learned. In this case, the processings regarding sub-feedback control and the oxygen sensor 66 can be omitted as well.

The invention is also applicable to an internal combustion engine having one, two, or three cylinders or to an internal combustion engine having five or more cylinders.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the, appended claims.

The invention claimed is:

1. An air-fuel ratio control apparatus for an internal combustion engine that includes a lift amount change mechanism for changing a lift amount of intake valves and a sensor for outputting a signal corresponding to a concentration of oxygen in exhaust gas and sets a fuel injection amount command value through a feedback control using a correction amount calculated based on an output value of the sensor, the air-fuel ratio control apparatus comprising:

- a learning unit that learns amounts of divergence of the correction amount from a reference value thereof as divergence amount learning values respectively as to a plurality of set lift amount regions;
- a correction unit that calculates a divergence amount correction value based on the respective divergence amount learning values learned by the learning unit and the lift amount of the intake valves and correcting the fuel injection amount command value in an increasing/decreasing manner with the calculated divergence amount correction value;
- wherein a reflection unit that reflects a learning result of the divergence amount learning value of a specific one of the plurality of the set lift amount regions on the divergence amount learning value of another one of the lift amount regions if there is a history indicating that the divergence amount learning value of the specific one of the lift amount regions has been learned and there is no history indicating that the divergence amount learning value of that another one of the lift amount regions has been learned,
- wherein the reflection unit appropriates the divergence amount learning value of the specific one of the lift amount regions as the divergence amount learning value of that another one of the lift amount regions if a lift amount in another one of the lift amount regions is smaller than the lift amount in the specific one of the lift amount region.

2. The air-fuel ratio control apparatus according to claim 1, wherein the reflection unit increases the divergence amount learning value of that another one of the lift amount regions to exceed the divergence amount learning value of the specific one of the lift amount regions as that another one of the lift amount regions is located more toward the small lift amount side with respect to the specific one of the lift amount regions.

3. The air-fuel ratio control apparatus according to claim 1, wherein the internal combustion engine has an exhaust passage thereof with an exhaust gas purification catalyst, and
- the sensor is provided downstream of the exhaust gas purification catalyst in the exhaust passage with respect to a direction in which exhaust gas flows.

4. The air-fuel ratio control apparatus according to claim 3, wherein the internal combustion engine includes another sensor for outputting a signal corresponding to a concentration of oxygen in exhaust gas, which is located upstream of the exhaust gas purification catalyst in the exhaust passage with respect to the direction in which exhaust gas flows, in addition to the sensor located downstream of the exhaust gas purification catalyst in the exhaust passage with respect to the direction in which exhaust gas flows, the air-fuel ratio control apparatus correcting the fuel injection amount command value in an increasing/decreasing manner on a basis of an output value of the sensor located upstream in accordance with performance of the feedback control.

5. The air-fuel ratio control apparatus according to claim 4, wherein the internal combustion engine is a multi-cylinder internal combustion engine, and
- the sensor located upstream is provided as a single sensor common to all cylinders of the internal combustion engine.

6. The air-fuel ratio control apparatus according to claim 1, wherein the plurality of the set lift amount regions are composed of a first specific lift amount and a second specific lift amount, and
- the correction unit calculates the divergence amount correction value by interpolating the divergence amount learning values learned respectively as to the first specific lift amount and the second specific lift amount, based on a relationship between both the specific lift amounts and the lift amount of the intake valves.

7. The air-fuel ratio control apparatus according to claim 6, wherein the first specific lift amount is a control limit lift amount on a large lift amount side, and
- the second specific lift amount is a control limit lift amount on the small lift amount side.

8. The air-fuel ratio control apparatus according to claim 6, wherein the divergence amount learning values are interpolated using linear interpolation.

9. The air-fuel ratio control apparatus according to claim 6, wherein the divergence amount learning values are interpolated using a map that defines a relationship between lift amount and divergence amount correction value.

10. The air-fuel ratio control apparatus according to claim 1, wherein the correction unit selects one of the plurality of the lift amount regions based on the lift amount of the intake valves and calculates that one of the divergence amount learning values which corresponds to the selected one of the regions as the divergence amount correction value.

11. An air-fuel ratio control method for an internal combustion engine that includes a lift amount change mechanism for changing a lift amount of intake valves and a sensor for outputting a signal corresponding to a concentration of oxygen in exhaust gas, and sets a fuel injection amount command value through a feedback control using a correction amount calculated based on an output value of the sensor, comprising:
- learning amounts of divergence of the correction amount from a reference value thereof as divergence amount learning values as to a plurality of set lift amount regions respectively;
- calculating a divergence amount correction value based on the divergence amount learning values and the lift amount of the intake valves and correcting the fuel injection amount command value in an increasing/decreasing manner with the calculated divergence amount correction value; and
- wherein reflecting a learning result of the divergence amount learning value of a specific one of the plurality of the set lift amount regions on the divergence amount learning value of another one of the lift amount regions when there is a history indicating that the divergence amount learning value of the specific one of the lift amount regions has been learned and there is no history that indicates the divergence amount learning value of that another one of the lift amount regions has been learned,
- wherein the learning result of the divergence amount learning value of the specific one of the lift amount regions is reflected on the divergence amount learning value of that another one of the lift amount regions by appropriating the divergence amount learning value of the specific one of the lift amount regions as the divergence amount learning value of that another one of the lift amount regions when that another one of the lift amount regions is located on a small lift amount side with respect to the specific one of the lift amount regions.

12. The air-fuel ratio control method according to claim 11, wherein the learning result of the divergence amount learning value of the specific one of the lift amount regions is reflected on the divergence amount learning value of that another one of the lift amount regions by making the divergence amount learning value of that another one of the lift amount regions even larger than the divergence amount learning value of the specific one of the lift amount regions as that another one of the lift amount regions is located more toward a small lift amount side with respect to the specific one of the lift amount regions.

* * * * *